United States Patent
Jiang et al.

(10) Patent No.: US 9,774,424 B2
(45) Date of Patent: *Sep. 26, 2017

(54) SIGNALING OF RANDOM ACCESS PREAMBLE SEQUENCES IN WIRELESS NETWORKS

(71) Applicant: Intel Corporation, Santa Clara, CA (US)

(72) Inventors: Jing Jiang, Wellesley, MA (US); Pierre Bertrand, Antibes (FR); Tarik Muharemovic, Dallas, TX (US)

(73) Assignee: Intel Corporation, Santa Clara, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 14/326,354

(22) Filed: Jul. 8, 2014

(65) Prior Publication Data
US 2014/0341010 A1 Nov. 20, 2014

Related U.S. Application Data

(63) Continuation of application No. 12/184,239, filed on Jul. 31, 2008, now Pat. No. 8,773,968.
(Continued)

(51) Int. Cl.
*H04J 13/00* (2011.01)
*H04L 5/00* (2006.01)
(Continued)

(52) U.S. Cl.
CPC ........ *H04L 5/0007* (2013.01); *H04J 13/0059* (2013.01); *H04J 13/0062* (2013.01);
(Continued)

(58) Field of Classification Search
CPC ............... H04J 13/0059; H04J 13/0062; H04J 13/0074; H04L 5/0007; H04L 27/2601;
(Continued)

(56) References Cited

U.S. PATENT DOCUMENTS 7,778,151 B2   8/2010   Bertrand et al.
7,952,991 B2   5/2011   Kim et al.
(Continued)

OTHER PUBLICATIONS

3GPP, "Technical Specification Group Radio Access Network; Physical Channels and Modulation (Release 8)", 3GPP TS 36.211, v1.0.0, Mar. 2007, pp. 1-30.
(Continued)

*Primary Examiner* — Alpus H Hsu
(74) *Attorney, Agent, or Firm* — Schwegman Lundberg & Woessner, P.A.

(57) ABSTRACT

Transmission of random access preamble structures within a cellular wireless network is based on the use of cyclic shifted constant amplitude zero autocorrelation ("CAZAC") sequences to generate the random access preamble signal. A pre-defined set of sequences is arranged in a specific order. Within the predefined set of sequences is an ordered group of sequences that is a proper subset of the pre-defined set of sequences. Within a given cell, up to 64 sequences may need to be signaled. In order to minimize the associated overhead due to signaling multiple sequences, only one logical index is transmitted by a base station serving the cell and a user equipment within the cell derives the subsequent indexes according to the pre-defined ordering. Each sequence has a unique logical index. The ordering of sequences is identified by the logical indexes of the sequences, with each logical index uniquely mapped to a generating index. When a UE needs to transmit, it produces a second sequence using the received indication of the logical index of the first sequence and an auxiliary parameter and then produces a transmission signal by modulating the second sequence.

20 Claims, 12 Drawing Sheets

Related U.S. Application Data

(60) Provisional application No. 60/954,194, filed on Aug. 6, 2007, provisional application No. 60/970,737, filed on Sep. 7, 2007, provisional application No. 60/972,939, filed on Sep. 17, 2007, provisional application No. 60/975,276, filed on Sep. 26, 2007, provisional application No. 60/988,508, filed on Nov. 16, 2007.

(51) Int. Cl.
*H04L 27/26* (2006.01)
*H04W 74/08* (2009.01)

(52) U.S. Cl.
CPC ...... *H04J 13/0074* (2013.01); *H04L 27/2601* (2013.01); *H04L 27/2607* (2013.01); *H04L 27/2613* (2013.01); *H04W 74/08* (2013.01)

(58) Field of Classification Search
CPC . H04L 27/2607; H04L 27/2613; H04W 74/08
See application file for complete search history.

(56) References Cited

U.S. PATENT DOCUMENTS

| | | |
|---|---|---|
| 7,991,084 B2 | 8/2011 | Hooli et al. |
| 8,068,457 B2 | 11/2011 | Pi et al. |
| 8,098,745 B2 | 1/2012 | Bertrand et al. |
| 8,218,496 B2 * | 7/2012 | Bertrand ........... H04W 74/0883 370/329 |
| 8,234,325 B2 | 7/2012 | Lee et al. |
| 8,259,598 B2 | 9/2012 | Bertrand et al. |
| 8,654,624 B2 | 2/2014 | Hao et al. |
| 2006/0050799 A1 | 3/2006 | Hou et al. |
| 2007/0195906 A1 | 8/2007 | Kim et al. |
| 2007/0230600 A1 | 10/2007 | Bertrand et al. |
| 2008/0080461 A1 | 4/2008 | Lee |
| 2008/0194259 A1 | 8/2008 | Vujcic et al. |
| 2008/0212464 A1 | 9/2008 | Kim et al. |
| 2008/0235314 A1 | 9/2008 | Lee et al. |
| 2008/0240285 A1 | 10/2008 | Han et al. |
| 2009/0073944 A1 * | 3/2009 | Jiang ........................ H04J 11/00 370/338 |
| 2009/0186625 A1 | 7/2009 | Qu et al. |
| 2010/0118799 A1 | 5/2010 | Lee et al. |
| 2010/0220664 A1 | 9/2010 | Hooli et al. |
| 2010/0296591 A1 | 11/2010 | Xu et al. |
| 2012/0263214 A1 | 10/2012 | Lee et al. |

OTHER PUBLICATIONS

3GPP, "Technical Specification Group Radio Access Network; Physical Layer Procedures (Release 8)", TS 36.213, v1.0.0, Mar. 2007, pp. 1-11.
Motorola, "Cubic Metric in 3GPP-LTE", R1-060023, 3GPP TSG RAN WG1 LTE Adhoc, Jan. 23-26, 2006, Helsinki, Finland, pp. 1-7.
LT Electronics, "Ways to Mitigate Frequency Offset with CAZAC Cyclic Shift", R1-070227, 3GPP TSG RAN WG1 Meeting #47bis, Jan. 15-19, 2007, Sorrento, Italy, pp. 1-8.
Nokia, "Restricted Sets of RACH Preamble Signatures for Environments with Doppler Shifts", R1-070377, 3GPP TSG RAN WG1 #47bis, Jan. 16-19, 2007, Sorrento, Italy, pp. 1-6.
Huawei, "Specification of Restricted Set of Cyclic Shifts of Root Zadoff-Chu Sequences", R1-071408, TSG RAN WG1 Meeting #48bis, Mar. 26-30, 2007, Malta, St. Julian's, pp. 1-4.
Huawei, "RACH Sequence Indication Method on BCH", R1-071519, 3GPP TSG RAN WG1 Meeting #48bis, Mar. 26-30, 2007, Malta, St. Julian's, pp. 1-3.
Panasonic, "RACH Sequence Allocation and Indication to the Cell", R1-072079, 3GPP TSG RAN WG1 Meeting #49, May 7-11, 2007, Kobe, Japan, pp. 1-7.
Texas Instruments, "Random Access Preamble L1 Parameters in E-UTRA", R1-072192, 3GPP TSG RAN WG1 #49, May 7-11, 2007, Kobe, Japan, pp. 1-3.
Nokia, "On Construction and Signaling of RACH Preambles", R1-072268, 3GPP TSG RAN WG1 #49, May 7-11, 2007, Kobe, Japan, pp. 1-5.
LG Electronics, "Formula for Restricted Cyclic Shift Set", R1-072331, #GPP TSG RAN WG1 Meeting #49, May 7-11, 2007, Kobe, Japan, pp. 1-8.
Panasonic, NTT DoCoMo, "RACH Sequence Allocation and Indication to the Cell," R1-072800, 3GPP TSG RAN WG1 Meeting #bis, Jun. 25-29, 2007, Orlando, FL, pp. 1-9.
Panasonic NTT DoCoMo, "Limitation of RACH Sequence Aliecation for High Mobility Cell", R1-073175, 3GPP TSG RAN WG1 Meeting #40bis, Jun. 25-29, 2007, Orlando, Florida, USA, pp. 1-8.
LG Electronics, "Preamble index Flapping for Non-Synchronized RACH", R1-073501, 3GPP TSG RAN WG1 Meeting #50, Aug. 20-24, 2007, Athens, Greece, pp. 1-4.
LG Electronics, Nokia, Nokia Siemens Networks, "Comparison of Formula for Restricted Cyclic Shift Set", R1-073502, 3GPP TSG RAN WG1 Meeting #50, Aug. 20-24, 2007, Athens, Greece, pp. 1 of 6.
Huawei, "Multiple Values of Cyclic Shift Increments Ncs", R1-073515, TSG RAN WG1 Meeting #50, Aug. 20-24, 2007, Athens, Greece, pp. 1-5.
Huawei, Panasonic, "Specification of Restricted Set of Cyclic Shifts of Root Zadoff-Chu Sequences", R1-073516, TSG RAN WG1 Meeting #50, Aug. 20-24, 2007, Athens, Greece, pp. 1-6.
Samsung, Determination of the Cyclic Shift Amount, Nos. R1-073553, 3GPP TSG RAN WG1 Meeting #50, Aug. 20-24, 2007, Athens, Greece, pp. 1-3.
LGE Electronics, "Discussion on Contention and Dedicated Resource Allocation", R1-073709, 3GPP TSG RAN WG1 #50, Athens, Greece, Aug. 20-24, 2007, pp. 1-4.
Panasonic, NTT DoCoMo, "RACH Sequence Allocation and Indication to the Cell", R1-073836, 3GPP TSG RAN WG1 Meeting #50, Aug. 20-24, 2007, Athens, Greece, pp. 1-10.
Texas Instruments, LG Electronics, Huawei, Alcatel-Lucent, Nokia, Nokia Siemens Networks, Panasonic, NTT DoCoMo, "Way Forward Proposal on PRACH Sequence Ordering", R1-074514, 3GPP TSG RAN WG1 #50bis, Oct. 8-12, 2007, Shanghai, China, pp. 1-3.
Texas Instruments, Panasonic, LG Electronics, NTT DoCoMo, Huawei, "PRACH High-Speed Ncs Values", R1-075058, 3GPP TSG RAN WG1 #51, Nov. 5-9, 2007, Jeju, Korea, pp. 1-6.
Texas Instruments, "Signaling of Random Access Preamble Parameters in Wireless Networks", U.S. Appl. No. 11/970,239, filed Jan. 7, 2008, Inventor Pierre Bertrand, et al.

* cited by examiner

SIGNALING OF RANDOM ACCESS PREAMBLE SEQUENCES IN WIRELESS NETWORKS

CLAIM OF PRIORITY UNDER 35 U.S.C. 119(e)

The present application is a Continuation of application Ser. No. 12/184,239 filed Jul. 31, 2008, now U.S. Pat. No. 8,773,968, which claims priority to and incorporates by reference U.S. provisional application No. 60/954,194 filed on Aug. 6, 2007, entitled "Preamble Sequence Planning for LTE Random Access." The present application also claims priority to and incorporates by reference U.S. provisional application No. 60/970,737 filed on Sep. 7, 2007, entitled "Optimized Sequence Ordering and Signature Mapping for Random Access Preamble in Wireless Networks." The present application also claims priority to and incorporates by reference U.S. provisional application No. 60/972,939 filed on Sep. 17, 2007, entitled "Optimized Sequence Ordering and Signature Mapping for Random Access Preamble in Wireless Networks." The present application also claims priority to and incorporates by reference U.S. provisional application No. 60/975,276 filed on Sep. 26, 2007, entitled "Random Access Preamble Sequences Grouping and Ordering." The present application also claims priority to and incorporates by reference U.S. provisional application No. 60/988,508 filed on Nov. 16, 2007, entitled "Random Access Preamble Sequence Ordering in Frequency Domain."

FIELD OF THE INVENTION

This invention generally relates to wireless cellular communication, and in particular to a non-synchronous request channel for use in orthogonal and single carrier frequency division multiple access (OFDMA) (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

Long Term Evolution (LTE) wireless networks, also known as Evolved Universal Terrestrial Radio Access Network (E-UTRAN), are being standardized by the 3GPP working groups (WG). OFDMA and SC-FDMA (single carrier FDMA) access schemes were chosen for the downlink (DL) and up-link (UL) of E-UTRAN, respectively. User Equipments (UE's) are time and frequency multiplexed on a physical uplink shared channel (PUSCH), and a fine time and frequency synchronization between UE's guarantees optimal intra-cell orthogonality. In case the UE is not UL synchronized, it uses a non-synchronized Physical Random Access Channel (PRACH), and the Base Station (also referred to as eNodeB) provides back some allocated UL resource and timing advance information to allow the UE transmitting on the PUSCH. The 3GPP RAN Working Group 1 (WG1) has agreed on the preamble based physical structure of the PRACH. RAN WG1 also agreed on the number of available preambles that can be used concurrently to minimize the collision probability between UEs accessing the PRACH in a contention-based manner. These preambles are multiplexed in CDM (code division multiplexing) and the sequences used are Constant Amplitude Zero Auto-Correlation (CAZAC) sequences. All preambles are generated by cyclic shifts of a number of root sequences, which are configurable on a cell-basis.

Depending on whether contention is involved or not, a Random Access (RA) procedure is classified into contention based and non-contention based (or contention-free). While the contention based procedure can be used by any accessing UE in need of uplink connection, the non-contention based is only applicable to handover and downlink data arrival events. In both procedures, a RA preamble is transmitted by the accessing UE to allow NodeB to estimate, and if needed, adjust the UE transmission time to within a cyclic prefix. It is agreed that there are 64 total RA preambles allocated for each cell of a NodeB, and each NodeB dynamically configures two disjoint sets of preambles to be used by the two RA procedures separately. The set for contention-based is broadcasted to all UEs by the NodeB, and the rest of the preambles in the other set are assigned by the NodeB one by one to the UEs in contention-free procedure.

Zadoff-Chu (ZC) sequence has been selected as RA preambles for LTE networks. Specifically, a cell can use different cyclic shifted versions of the same ZC root sequence, or other ZC root sequences if needed, as RA preambles. Depending on whether a cell supports high-speed UEs (i.e., a high-speed cell) or not, sequence and cyclic shift allocation to a cell may differ.

The non-synchronized PRACH is multiplexed with scheduled data in a TDM/FDM manner. It is accessible during PRACH slots of duration $T_{RA}$ and period $T_{RA}$. The general operations of the physical random access channels are described in the specifications for evolved universal terrestrial radio access (EUTRA), for example: "3$^{rd}$ Generation Partnership Project; Technical Specification Group Radio Access Network; Evolved Universal Terrestrial Radio Access (E-UTRA); Physical Channels and Modulation (Release 8).", as defined by the 3GPP working groups (WG). The EUTRA is sometimes also referred to as 3GPP long-term evolution (3GPP LTE).

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Disclosed herein are various systems and methods for employing a random access channel in a wireless network to accommodate user equipment operating in cells of varying sizes. Embodiments of the disclosed invention may be used to access a wireless network, such as a telecommunications system, employing random access techniques. A variety of wireless networks employ random access techniques, for example the Enhanced Universal Terrestrial Radio Access Network (E-UTRAN), currently being standardized by the 3GPP working groups. The disclosed embodiments of the invention are applicable to all such networks. The disclosed embodiments include apparatus for transmitting random access signals and a method for transmitting a random access signal optimized for cellular coverage and high-speed UEs.

Embodiments of the present disclosure are directed, in general, to wireless communication systems, and can be applied to generate random access transmissions. Random access transmissions may also be referred to as ranging transmissions, or other analogous terms.

User Equipment ("UE") may be either up-link ("UL") synchronized or UL non-synchronized. That is, UE transmit timing may or may not be adjusted to align UE transmissions with NodeB transmission time slots. When the UE UL has not been time synchronized, or has lost time synchronization, the UE can perform a non-synchronized random access to request allocation of up-link resources. Additionally, a UE can perform non-synchronized random access to register itself at the access point, or for numerous other reasons. Possible uses of random access transmission are many, and do not restrict the scope of the present disclosure. For example, the non-synchronized random access allows the NodeB to estimate, and if necessary, to adjust the UE's transmission timing, as well as to allocate resources for the UE's subsequent up-link transmission. Resource requests from UL non-synchronized UEs may occur for a variety of reasons, for example: new network access, data ready to transmit, or handover procedures.

These RA preambles are multiplexed in CDM (code division multiplexing) and the sequences used are Constant Amplitude Zero Auto-Correlation (CAZAC) sequences. All preambles are generated by cyclic shifts of a number of root sequences, which are configurable on a cell-basis. In order to minimize the signaling overhead, only one root sequence is broadcasted in the cell, and the UE derives the remaining sequences according to a pre-defined order. For LTE networks, a cyclic shift restriction rule has been adopted to select usable cyclic shift of a given sequence for high-speed UEs, which essentially put a constraint on the sequence allocation for high-speed cells. The problem is that, given a LTE network of mixed cells in terms of cell size and supported UE speed, what sequence reordering and allocation should be used to provide the most efficient yet cost-effective sequence planning.

Figure 1:
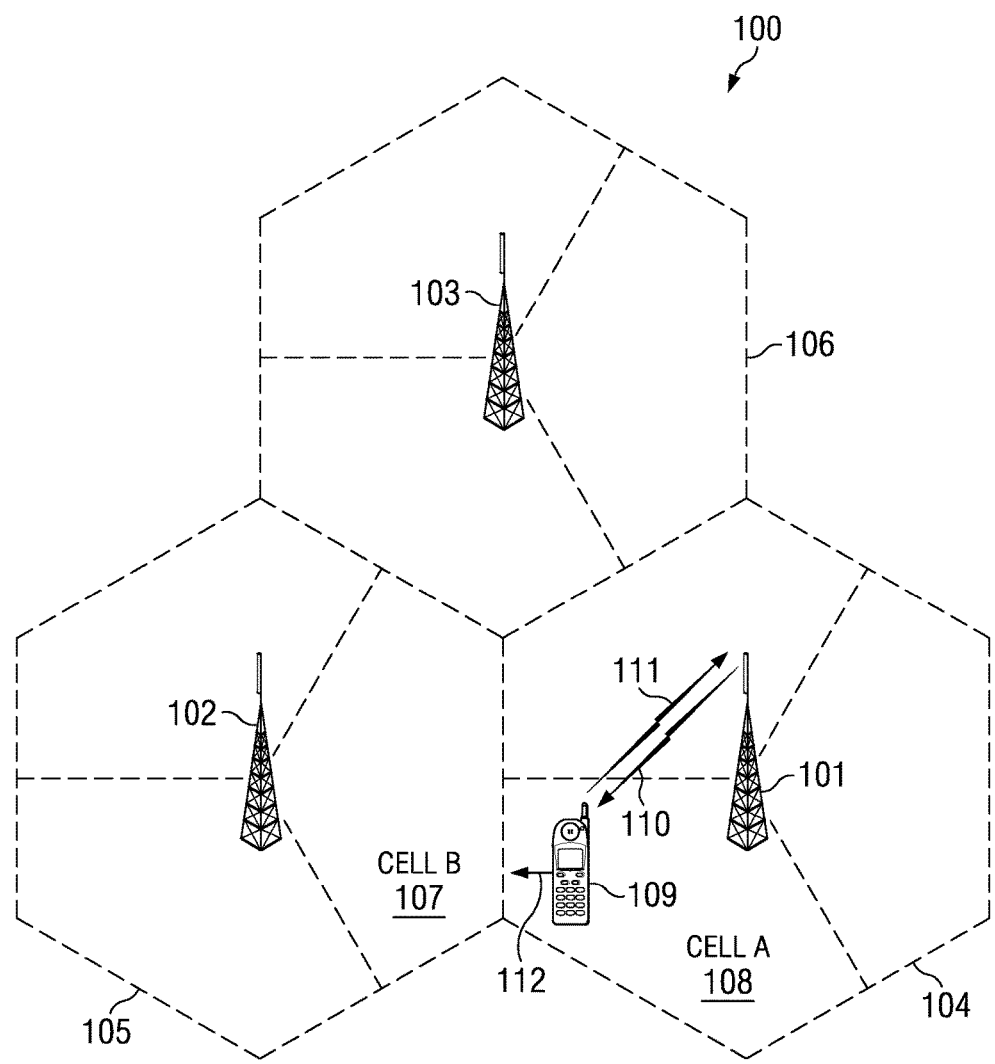
FIG. 1 is a pictorial of an illustrative telecommunications network that supports transmission of multiplexed random access preambles.

FIG. 1 shows an illustrative wireless telecommunications network 100. The illustrative telecommunications network includes base stations 101, 102, and 103, though in operation, a telecommunications network may include more base stations or fewer base stations. Each of base stations 101, 102, and 103 is operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109. As UE 109 moves out of Cell A 108, and into Cell B 107, UE 109 may be "handed over" to base station 102. Assuming that UE 109 is synchronized with base station 101, UE 109 likely employs non-synchronized random access to initiate handover to base station 102. The distance over which a random access signal is recognizable by base station 101 is a factor in determining cell size.

When UE 109 is not up-link synchronized with base station 101, non-synchronized UE 109 employs non-synchronous random access (NSRA) to request allocation of up-link 111 time or frequency or code resources. If UE 109 has data ready for transmission, for example, traffic data, measurements report, tracking area update, etc., UE 109 can transmit a random access signal on up-link 111 to base station 101. The random access signal notifies base station 101 that UE 109 requires up-link resources to transmit the UE's data. Base station 101 responds by transmitting to UE 109, via down-link 110, a message containing the parameters of the resources allocated for UE 109 up-link transmission along with a possible timing error correction. After receiving the resource allocation and a possible timing adjustment message transmitted on down-link 110 by base station 101, UE 109 may adjust its transmit timing, to bring the UE 109 into synchronization with base station 101, and transmit the data on up-link 111 employing the allotted resources during the prescribed time interval.

UE 109 is traveling in a direction with a ground speed as indicated by 112. The direction and ground speed results in a speed component that is relative to serving NodeB 101. Due to this relative speed of UE moving toward or away from its serving NodeB a Doppler shift occurs in the signals being transmitted from the UE to the NodeB resulting in a frequency shift and/or frequency spread that is speed dependent.

Figure 2:
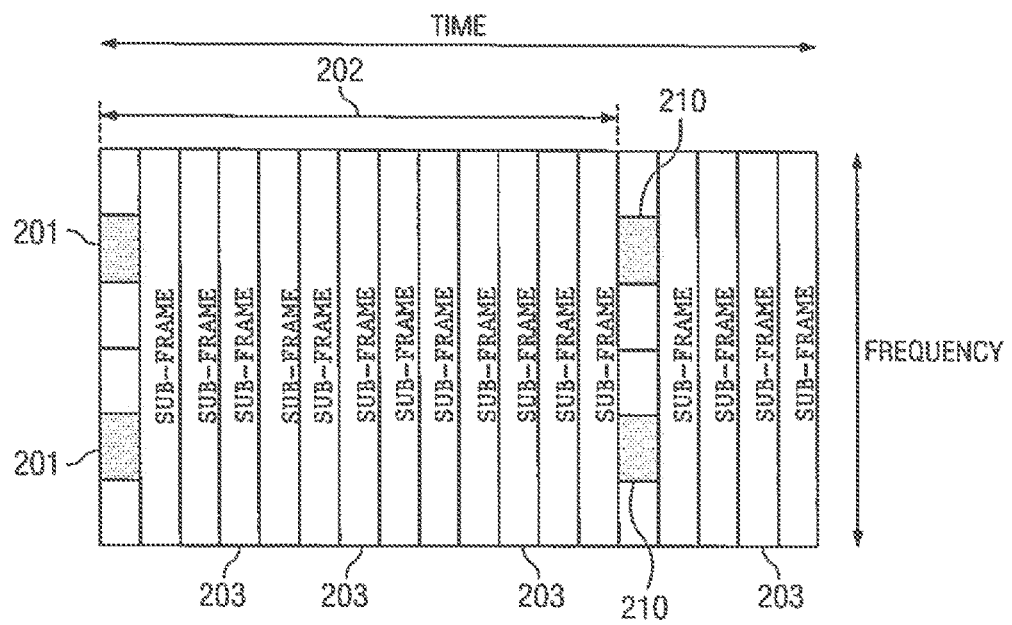
FIG. 2 is an illustrative up-link time/frequency allocation for random access channel use in the network of FIG. 1.

FIG. 2 illustrates an exemplary up-link transmission frame 202, and the allocation of the frame to scheduled and random access channels. The illustrative up-link transmission frame 202, comprises a plurality of transmission sub-frames. Sub-frames 203 are reserved for scheduled UE up-link transmissions. Interspersed among scheduled sub-frames 203, are time and frequency resources allocated to random access channels 201, 210. In the illustration of FIG. 2, a single sub-frame supports two random access channels. Note that the illustrated number and spacing of random access channels is purely a matter of convenience; a particular transmission frame implementation may allocate more or less resource to random access channels. Including multiple random access channels allows more UEs to simultaneously transmit a random access signal without collision. However, because each UE Independently chooses the random access channel on which it transmits, collisions between UE random access signals may occur.

Figure 3:
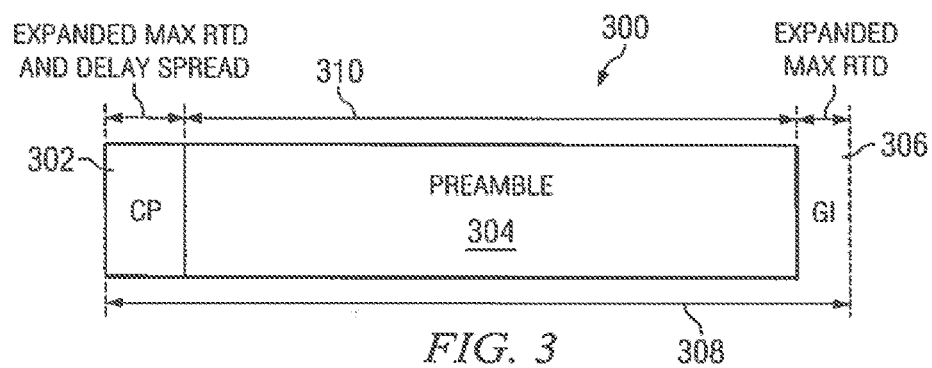
FIG. 3 illustrates a non-synchronized physical random access channel (PRACH) preamble structure in time domain for use in the uplink transmission of FIG. 2.

FIG. 3 illustrates an embodiment of a random access signal 300. The illustrated embodiment comprises cyclic prefix 302, random access preamble 304, and guard interval 306. Random access signal 300 is one transmission time interval 308 in duration. Transmission time interval 308 may comprise one or more sub-frame 203 durations. Note that the time allowed for random access signal transmission may vary, and this variable transmission time may be referred to as transmitting over a varying number of transmission time intervals, or as transmitting during a transmission time interval that varies in duration. This disclosure applies the term "transmission time interval" to refer to the time allocated for random access signal transmission of any selected duration, and it is understood that this use of the term is equivalent to uses referring to transmission over multiple transmission time intervals. The time period allotted for random access signal transmission may also be referred to as a random access time slot.

Cyclic prefix 302 and guard interval 306 are typically of unequal duration. Guard interval 306 has duration equal to approximately the maximum round trip delay of the cell while cyclic prefix 302 has duration equal to approximately the sum of the maximum round trip delay of the cell and the maximum delay spread. As indicated, cyclic prefix and guard interval durations may vary from the ideal values of maximum round trip delay and maximum delay spread while effectively optimizing the random access signal to maximize coverage. All such equivalents are intended to be within the scope of the present disclosure.

Round trip delay is a function of cell size, where cell size is defined as the maximum distance d at which a UE can interact with the cell's base station. Round trip delay can be approximated using the formula t=d*20/3 where t and d are expressed in microseconds and kilometers respectively. The round-trip delay is the two-way radio propagation delay in free space, which can be approximated by the delay of the earlier radio path. A typical earlier path is the line-of-sight path, defined as the direct (straight-line) radio path between the UE and the base station. When the UE is surrounded by reflectors, its radiated emission is reflected by these obstacles, creating multiple, longer traveling radio paths. Consequently, multiple time-delayed copies of the UE transmission arrive at the base station. The time period over which these copies are delayed is referred to as "delay spread," and for example, in some cases, 5 µs may be considered a conservative value thereof.

Cyclic prefix 302 serves to absorb multi-path signal energy resulting from reflections of a signal transmitted in the prior sub-frame, and to simplify and optimize equalization at the NodeB 101 receiver by reducing the effect of the channel transfer function from a linear (or aperiodic) correlation to a cyclic (or periodic) correlation operated across the observation interval 310. Guard Interval 306 follows random access preamble 304 to prevent interference between random access preamble signal 304 and any transmission in the subsequent sub-frame on the same transmission frequencies used by random access preamble signal 304.

Random access preamble signal 304 is designed to maximize the probability of preamble detection by the NodeB and to minimize the probability of false preamble detections by the NodeB, while maximizing the total number of resource opportunities. Embodiments of the present disclosure utilize constant amplitude zero autocorrelation ("CAZAC") sequences to generate the random access preamble signal. CAZAC sequences are complex-valued sequences with the following two properties: 1) constant amplitude (CA), and 2) zero cyclic autocorrelation (ZAC).

Figure 4:
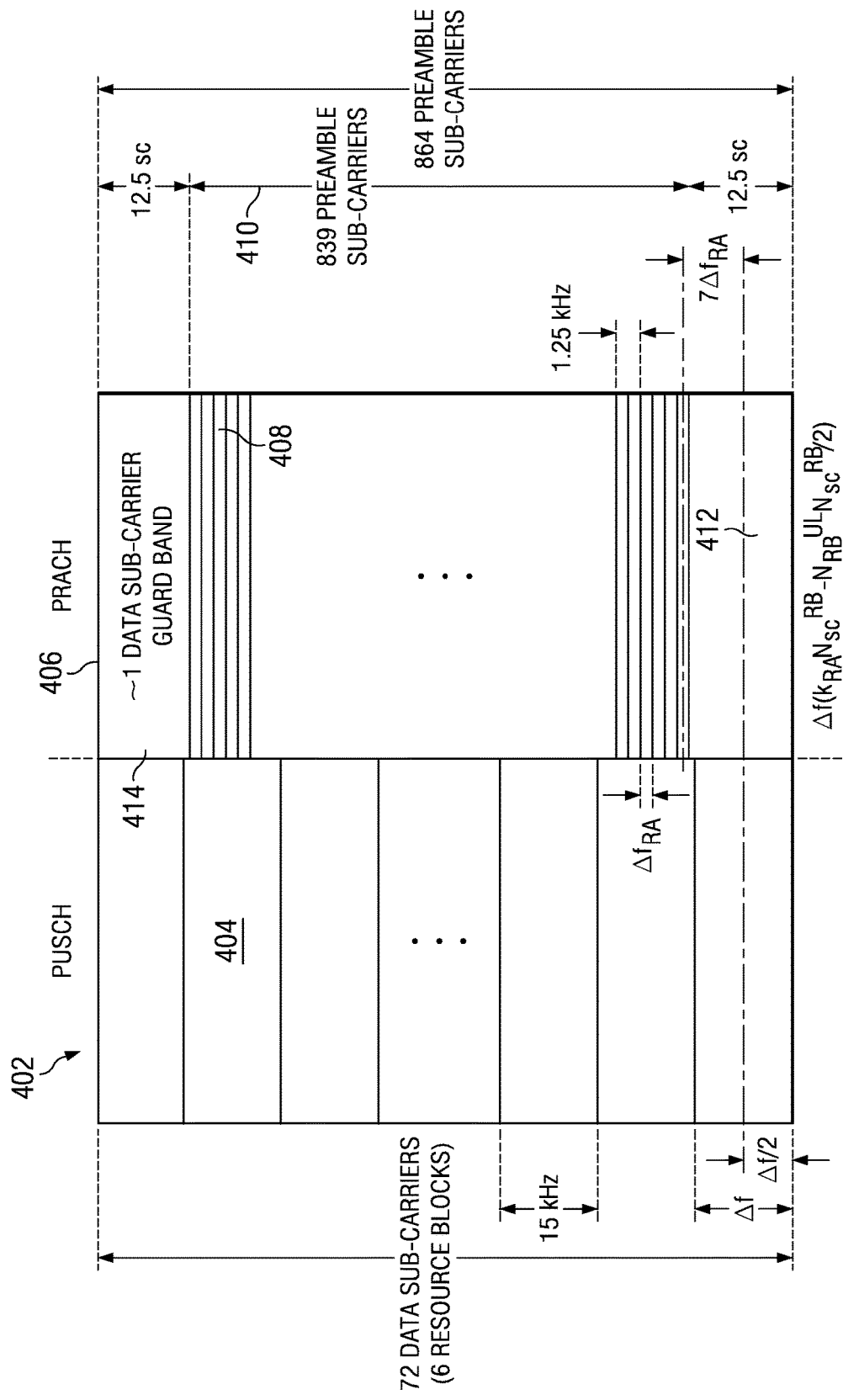
FIG. 4 is an illustration of the PRACH preamble structure in frequency domain for use in the uplink transmission of FIG. 2.

FIG. 4 is a more detailed illustration of the PRACH preamble structure for use in the uplink transmission of FIG. 2. FIG. 4 illustrates the preamble structure in frequency domain, while FIG. 3 illustrated the preamble structure in time domain. Physical uplink shared channel (PUSCH) structure 402 illustrates the seventy-two sub-carriers 404 that are each 15 kHz when the frequency resources are allocated to PUSCH, while physical random access channel (PRACH) preamble structure 406 illustrates the 864 sub-carriers 408 that are each 1.25 kHz when the frequency resources are allocated to PRACH. This embodiment uses guard bands 412, 414 to avoid the data interference at preamble edges.

The preamble sequence is a long CAZAC complex sequence allocated to the UE among a set of $R_S$ possible sequences. These sequences are built from cyclic shifts of a CAZAC root sequence. If additional sequences are needed, they are built from cyclic shifts of other CAZAC root sequences.

Well known examples of CAZAC sequences include, but are not limited to: Chu Sequences, Frank-Zadoff Sequences, Zadoff-Chu (ZC) Sequences, and Generalized Chirp-Like (GCL) Sequences. A known set of sequences with CAZAC property is the Zadoff-Chu N-length sequences defined as follows $$a_k = \exp\left[-j2\pi\frac{M}{N}\left(\frac{k(k+1)}{2} + qk\right)\right]$$

where M is relatively prime to N, N odd, and q any integer.

The M is the generating index of ZC sequence, which can also be referred to as physical root sequence index, physical root sequence number, and others, in various embodiments. Each root ZC sequence has a unique generating index.

The latter constraint on N also guarantees the lowest and constant-magnitude cross-correlation $\sqrt{N}$ between N-length sequences with different values of M: $M_1$, $M_2$ such that $(M_1-M_2)$ is relatively prime to N. As a result, choosing N a prime number always guarantees this property for all values of M<N, and therefore maximizes the set of additional sequences, non orthogonal, but with optimal cross-correlation property. On top of providing additional sequences for a UE to chose among in a given cell, these sequences are also intended to be used in neighboring cells, so as to provide good inter-cell Interference mitigation. In this disclosure, the terms: Zadoff-Chu, ZC, and ZC CAZAC, are used interchangeably. The term CAZAC denotes any CAZAC sequence, ZC or otherwise.

In various embodiments of the present disclosure, random access preamble signal 304 comprises a CAZAC sequence, such as a ZC sequence. Additional modifications to the selected CAZAC sequence can be performed using any of the following operations: multiplication by a complex constant, DFT, IDFT, FFT, IFFT, cyclic shifting, zero-padding, sequence block-repetition, sequence truncation, sequence cyclic-extension, and others. Thus, in one embodiment of the present disclosure, a UE constructs random access preamble signal 304 by selecting a CAZAC sequence, possibly applying a combination of the described modifications to the selected CAZAC sequence, modulating the modified sequence, and transmitting the resulting random access signal over the air.

Further aspects of embodiments of the Random Access (RA) channel operation are described in related U.S. Pat. No. 8,098,745 filed 27 Mar. 2007, entitled "Random Access Structure For Wireless Networks" by Pierre Bertrand, Jing Jiang, Tarik Muharemovic and Shantanu Kangude which is incorporated herein by reference; and in related U.S. patent application Ser. No. 11/833,329, filed 3 Aug. 2007, now U.S. Pat. No. 8,259,598, entitled "Random Access Structure For Optimal Cell Coverage" by Pierre Bertrand, Anand Dabak and Jing Jiang which is incorporated by reference herein.

The time-continuous PRACH preamble signal s(t) is defined by:

$$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+1/2))\Delta f_{RA}(t-T_{CP})}$$

where $$0 \le t < T_{SEQ} + T_{CP},$$

$\beta_{PRACH}$ is an amplitude scaling factor and $$k_0 = n_{PRB}^{RA} N_{sc}^{RB} - N_{RB}^{UL} N_{sc}^{RB}/2.$$

$T_{SEQ}$ is the sequence duration and $T_{CP}$ is the cyclic prefix duration. $N_{sc}^{RB}$ is the number of data subcarriers per resource block (RB) and $N_{RB}^{UL}$ is the total number of resource blocks available for UL transmission. The location in the frequency domain is controlled by the parameter $n_{PRB}^{RA}$, expressed as a resource block number configured by higher layers and fulfilling $$0 \le n_{PRB}^{RA} \le N_{RB}^{UL} - 6$$

The factor $$K = \Delta f / \Delta f_{RA}$$

accounts for the difference in subcarrier spacing between the random access preamble and uplink data transmission. The variable $\phi$ defines a fixed offset determining the frequency-domain location of the random access preamble within the resource blocks. The PRACH signal takes the following value for $\phi$: $\phi=7$.

The above numerical example applies to preamble burst formats 0 to 3. Same design principle is also applicable to burst format 4 with different numerical values.

The E-UTRA PRACH preamble is a Cyclically Shifted Zadoff-Chu (CS-ZC) sequence, as described in 3GPP TS 36.211 v1.0.0 (2007-03), Technical Specification Group Radio Access Network; Physical Channels and Modulation (Release 8). The construction of these sequences uses the Constant Amplitude Zero Auto-Correlation (CAZAC) property of the Zadoff-Chu (ZC) sequences by cyclically shifting a ZC root sequence by an amount guaranteed to maintain the orthogonality of the resultant sequences. For example, a ZC root sequence may be shifted by an integer multiple of the cell's maximum round trip delay plus the delay spread, to generate a set of orthogonal sequences. Additional preamble sequences may be generated by cyclically shifting other ZC root sequences. As a result, the cyclic shift and corresponding number of root sequences used in a cell are a function of the cell size. Generally, only one ZC root sequence index is signaled (implicitly or explicitly) to the UE, regardless the actual number of root sequences required in a cell. The UE can derive the subsequent root sequence indexes according to a pre-defined ordering. Before looking at the possible choices for this ZC ordering, we first list the various aspects that influence this design.

In this disclosure, the cyclically shifted or phase ramped CAZAC-like sequence is sometimes denoted as cyclic shifted base sequence, cyclic shifted root sequence, phase ramped base sequence, phase ramped root sequence, or any other equivalent term. In other places, the CAZAC-like sequence is generally referred to as the second sequence.

Cyclic Shift Configurations

In the present embodiment, a sequence length of 839 is assumed which means that ten bits are required to signal one Zadoff-Chu generating index. Given that up to 64 sequences may need to be signaled, it is highly desirable to minimize the associated overhead due to signaling multiple sequences. This is achieved by signaling only one logical index and the UE derives the subsequent indexes according to a pre-defined ordering. Each ZC sequence has a unique logical index. The ordering of sequences is identified by the logical indexes of the sequences, with each logical index uniquely mapped to a generating index. Note that in one embodiment, the ordering of sequences is the same as the ordering of their generating indexes. From the above considerations, cyclic shift and ZC generating indexes are configured on a cell basis. The cyclic shift value (or increment) is taken from among sixteen pre-defined values.

Random Access Preamble Signaling

As described above, the minimum Random Access preamble parameters that need be signaled are 19 bits:
Cyclic shift configuration (4 bits)
Unrestricted cyclic shift set or restricted cyclic shift set (1 bit)
$1^{st}$ ZC logical index (10 bits)
PRACH timing configuration (4 bits)

The signaling of cyclic shift configuration the cyclic shift set type (unrestricted or restricted) is to determine the value of cyclic shift to use. In various embodiments of signaling method, either one or two auxiliary parameters can be used to signal a cyclic shift value to use.

One auxiliary parameter is a 1-bit flag that signals whether the current cell is a high speed cell or not. For high speed cells, cyclic shift restrictions apply and the UE identifies which cyclic shifts must not be used. The excellent auto/cross-correlation of CS-ZC sequences allows supporting a much larger number of signature opportunities, 64, than the 16 Walsh-Hadamard opportunities offered in the current UMTS RACH preamble, and this with very little performance loss. However, the above performance assumes no or little Doppler spread or frequency shift, in presence of which, the CS-ZC sequence loses its zero-auto-correlation property. Indeed, high Doppler shifts induce correlation peaks in the receiver's bank of correlators offset by $d_u$ from the desired peak when the u-th root sequence of length $N_{zc}$ is transmitted. The cyclic offset $d_u$ depends on the generating index u, which can be derived from (1), or a mathematically equivalent expression, as $$d_u = \begin{cases} u^{-1} \bmod N_{ZC} & 0 \leq u^{-1} \bmod N_{ZC} < N_{ZC}/2 \\ N_{ZC} - u^{-1} \bmod N_{ZC} & \text{otherwise} \end{cases} \quad (1)$$

Where $u^{-1} \bmod N_{ZC}$ is the modulo inverse of $d_u$, in the sense of $$d_u \cdot u = 1 \bmod N_{ZC} \quad (2)$$

A solution to this problem of loss of zero-auto-correlation property is "masking" cyclic shift positions where side peaks are expected in the ZC root sequence. Therefore, for high speed cells where cyclic shift restrictions apply, more ZC root sequences will need to be configured compared to low-medium speed cells. Another impact of the side peaks is that they restrict the possible cyclic shift range so as to prevent from side peaks to occur within the used cyclic shift region.

It results that, in the case where the ZC sequences are not ordered by increasing maximum supportable high-speed cell size, there will be cases where, in a high-speed cell, some of the ZC sequences following the $1^{st}$ sequence signaled by the NodeB are not compliant with the cell radius of that cell. In which cases, these sequences are skipped.

To reduce NodeB signaling, in one embodiment, a single logical index is broadcasted to all UEs in a cell as the starting root sequence allocated to this cell for contention-based random access. In addition to that, the number of signatures for contention-based RA is also given, so that with $d_u$-based ordering, an accessing UE can derive from the ordering table the available root sequences, hence the usable signatures, given the usable cyclic shifts for each root sequence. Since a subset of signatures may be reserved for contention-free RA, in one embodiment NodeB can reserve the signatures with the lowest cubic metrics for contention-free RA, so that a UE uses the remaining subset of signatures of high cubic metrics for contention-based RA.

Cubic Metric of Zadoff-Chu Sequences

Figure 5:
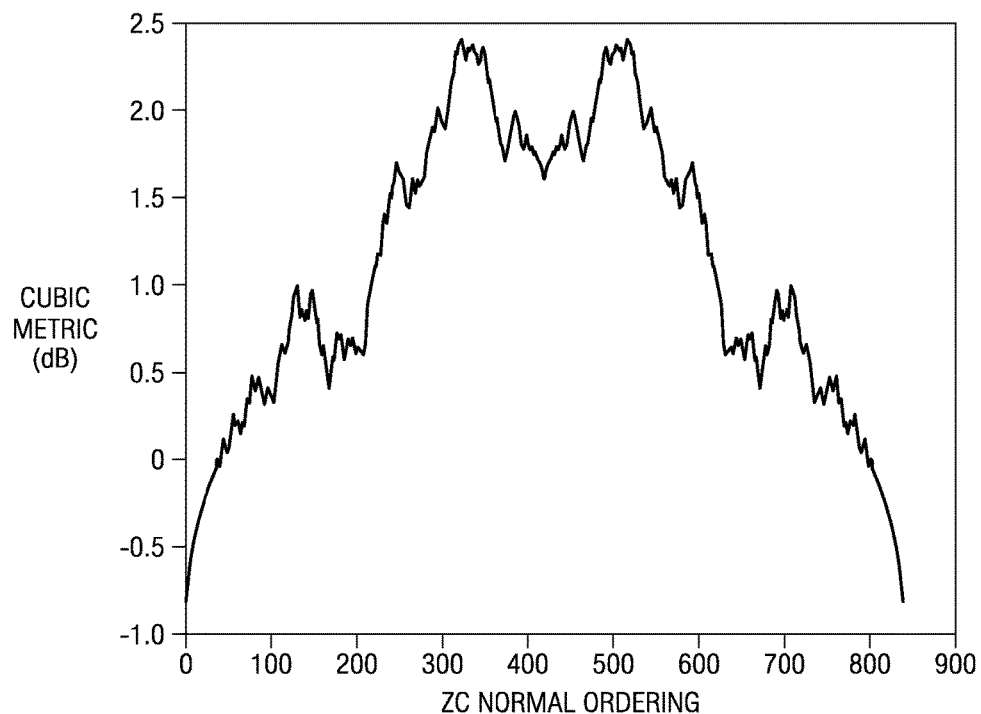
FIG. 5 is a plot illustrating the cubic metric (CM) of the set of Zadoff-Chu (ZC) sequences plotted according to the ZC_normal numeric ordering of generating index.

FIG. 5 is a plot illustrating the cubic metric (CM) of the set of 838 Zadoff-Chu (ZC) sequences plotted according to normal numeric ordering of their generating indexes. The cubic metric (CM) of the 838 possible ZC sequences is an important parameter to consider when allocating different ZC sequences to a cell. Indeed, as shown in FIG. 5, the CM can vary by up to 2.5 dB depending on the ZC sequences used in a cell, which result in unfair detection probability depending on the signature randomly selected by the UE and reduce the overall coverage performance of the PRACH.

The CM value for a given sequence is calculated as follows:

$$CM = \frac{20 \log_{10}\{\text{rms}\,[v_{norm}^3(t)]\} - 1.52}{1.56} \text{dB}$$

for the amount by which the power capability of a UE power amplifier must be de-rated for LTE signals with 3.84 MHz nominal bandwidth. Other embodiments may use variations of this calculation to determine a CM value.

Contention-free Access

The unpredictable latency of the Random Access procedure may be circumvented for some use-cases where low-latency is required, such as inter-eNodeB handover and DL traffic resume of a DRX UE in active mode, by allocating dedicated signatures to the UE on a need basis Preamble Information In the present embodiment, the signature sent by the UE out of the 64 available PRACH signatures per cell carries a five bit random ID, and one bit to indicate information on size of message-3 (of the Random Access procedure as defined in the 3GPP TS 36.300 v8.1.0 (2007-06), Technical Specification Group Radio Access Network; Evolved Universal Terrestrial Radio Access (E-UTRA) and Evolved Universal Terrestrial Radio Access Network (E-UTRAN); Overall description; Stage 2; (Release 8)) or requested resource blocks (FFS) limited by radio conditions. The groups of signatures that are used for indicating the one bit information, as well as necessary thresholds are broadcast by the each NodeB for the served cell. In other words, two possible message sizes are broadcasted in the cell and the UE chooses the message size depending on its radio conditions (the worse the radio condition, the smaller the message size) and the PRACH use case (some use cases require only few bits to transmit so that choosing the small message size saves unnecessary allocated resources). It should be understood that in other embodiments, different numbers of signatures and ID sizes may be used.

Sequence Ordering

Several schemes for performing sequence ordering will be described herein. Different embodiments of the present invention may use one or a combination of these schemes:
1. CM-based sequence ordering
2. High-speed cell-size (or $S_{max}$-based) ordering;
3. Hybrid orderings:
    3a. CM-based sequence grouping with alternate $S_{max}$ ordering in consecutive groups
    3b. $S_{max}$-based sequence grouping with alternate CM ordering in consecutive groups
    3c. Combination of 3a and 3b;
4. Hybrid orderings in both time and frequency domain, without using a transmit filter.

CM-Based Ordering

Figure 6:
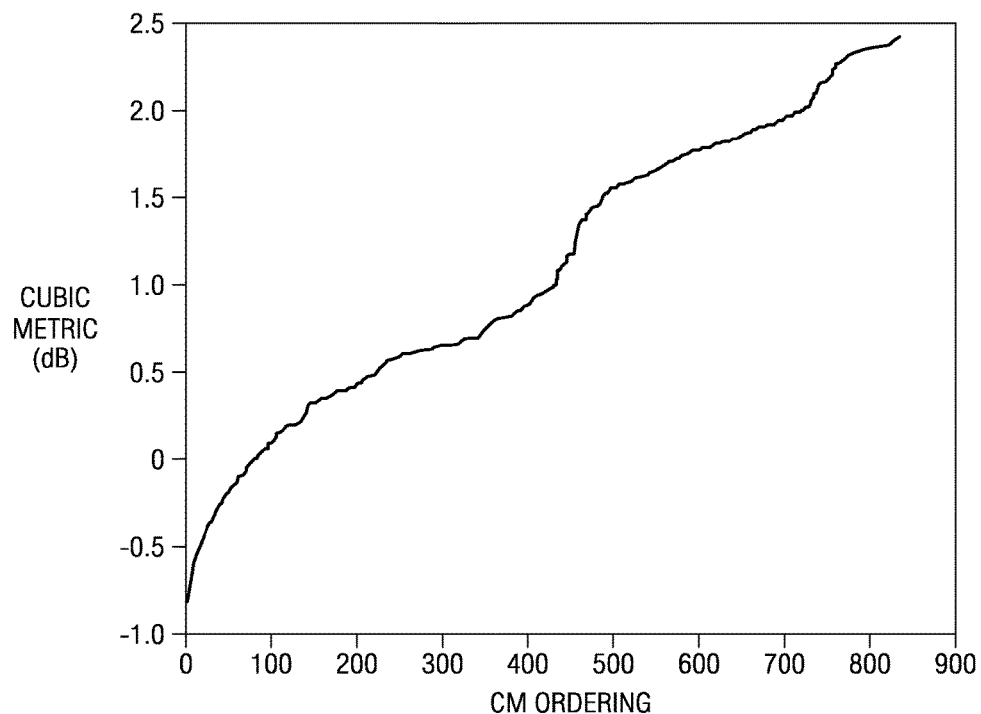
FIG. 6 is a plot illustrating the CM of the ZC sequences plotted according to CM ordering.

Since the CM is a measure of the required power back-off at the UE, this value can be optimized depending e.g. on the cell size. For example, low CM ZCs can be allocated to larger cells (where cell-edge UEs will most likely have tougher propagation conditions). FIG. 5 shows the CM variation as a function of the ZC generating index. As can be seen, if $N_{ZC}$ is the ZC sequence length, the CM roughly follows an increasing trend as generating index increases in addition to the symmetry between the r-th and (N−r)-th sequences. As a result, the simplest ZC sequence generating index ordering is: 1, N−1, 2, N−2, ..., r, N−r, ..., ⌊N/2⌋, ⌉N/2⌈. A more exact ordering by increasing CM can be obtained from FIG. 6

This ordering guarantees that when multiple ZC sequences are to be used in the same cell, they have similar CM properties, which aims at providing homogeneous detection probability of all root sequences used in a cell. It also allows for a CM-based ZC sequence planning. For example, low CM ZCs can be allocated to larger cells (where cell-edge UEs will most likely have tougher propagation conditions).

High-speed Cell-size Ordering

In another embodiment, sequences may be ordered based on maximum supportable high-speed cell size. This assumes that a sequence restriction rule is applied for high-speed cells, that is, two conditions are to be satisfied by the ZC root sequences allocated to a high-speed cell. The two conditions are, respectively, $$d_u \geq N_{CS} \quad \text{Condition \#1:}$$

and $$d_u \leq (N_{ZC} - N_{CS})/2 \quad \text{Condition \#2:}$$

The parameters $N_{ZC}$ and $N_{CS}$ are the length of ZC sequence and the value of allowed cyclic shift at high speed, respectively, and $d_u$ is as defined before.

The maximum supportable cell radius of a ZC sequence at high speed is defined as $$R_{max} = (S_{max} \cdot T_p - \tau_{max}) \times 3/20 \quad (3)$$

in kilometer, with $T_p$ being the preamble sample period in micro-second, $\tau_{max}$ being the maximum delay spread of the cell in micro-second, and $S_{max}$ being the maximum allowed cyclic shift of a ZC sequence at high speed computed from $$S_{max} = \min(d_u, N_{ZC} - d_u, |N_{ZC} - 2d_u|). \quad (4)$$

Since $S_{max}$ is linearly proportional to the maximum supportable cell size, with $S_{max}$-based reordering, sequence allocation can be started from the largest high-speed cell in an increasing order of logical index. That is, once a logical index with its $R_{max}$ above cell radius is identified as the starting logical index for this cell, the following successive subset is then allocated together for the total required signatures by counting the usable cyclic shifts for each root sequence based on conditions 1 and 2. The allocation then proceeds to the next largest high-speed cell. If it is out of consecutive sequences for a high-speed cell, the allocated sequences to the next largest high-speed cell can be shifted to the high $S_{max}$ end to leave just enough space for the cell to fit in if there is still space to its high end. The shift should start from low end to high end corresponding to the allocation to the next largest cell one by one. Low-speed cells are allocated after high-speed cells and they use consecutive subsets at the low end among remaining sequences. Allocation starts from the low end for low-speed cells. If it is out of consecutive sequences for a low-speed cell, the allocated sequences can be shifted toward high end one by one. This way, the most efficient use of all root sequences by both high-speed and low-speed cells is achieved.

It should be noted that due to the symmetry between the u-th root sequence and the (K−u)-th root sequence in both CM and $S_{max}$, only half of this Table needs to be stored at each UE given a pre-assumed ordering of u and (K−u). The same concept applies when ZC sequences are used in frequency-domain, where a different but similar table can be used.

Hybrid Approach

When both performance metrics, CM and $S_{max}$, are of concern in sequence ordering, a hybrid approach can be used to accommodate the conflicting ordering based on both. In particular, two levels of sequence grouping are used with the first level of grouping based on one metric, and the second level of grouping based on the other metric. The second-level grouping can be viewed as a sub-grouping within one first-level group. The metric of a hybrid approach is the efficient sequence allocation to both low-speed and high-speed cell, while the good cell coverage and persistent preamble detection performance can be achieved at the same time.

For a hybrid sequence ordering, a set of CM values and a set of high-speed cyclic shift values are predefined for two levels of sequence grouping.

$S_{max}$-based Sequence Grouping with Alternate CM Ordering in Consecutive Groups In this method, the ZC root sequences are grouped according to their maximum supportable cell radius (or maximum allowed cyclic shift $S_{max}$ at high speed), and sequences in each group are ordered according to their cubic metric (CM) respectively. The intra-group sequence ordering in CM takes alternate increasing and decreasing directions across consecutive groups. This ordering arrangement ensures that consecutive sequences have close CM values when allocated to a cell, such that consistent cell coverage and preamble detection can be achieved in one cell. Sequences also suffer less discontinuity in the CM when not allocated.

Specifically, ZC root sequences are first grouped according to their respective maximum supportable cell radius to facilitate sequence planning including high-speed cells, where a sequence group g is the set of all root sequences with their maximum allowed cyclic shifts ($S_{max}$) lying between two consecutive high-speed $N_{CS}$ values according to $$N_{CS}(g) \leq S_{max} < N_{CS}(g+1), \text{ for } g=1, \ldots, G+1,$$

with $N_{CS}(1)=1$ and $N_{CS}(G+2)=N_{ZC}$ as boundary values, and G high-speed cyclic shift values $N_{CS}(g)$ for g=2, ..., G+1.

CM-based Sequence Grouping with Alternate $S_{max}$ Ordering in Consecutive Groups This method groups the sequences according to their CM values first, then within each group, the sequences are ordered according to their maximum allowed cyclic shifts $S_{max}$ at high speed. Alternate $S_{max}$ ordering is used in adjacent groups. An example design with CM grouping values is based on 1.2 dB, 1.7 dB, 2.2 dB, that is 4 CM-based sequence groups are used, with their group CM (in dB) in the intervals of (−∞, 1.2], (1.2, 1.7], (1.7, 2.2], (2.2, ∞).

Combined Hybrid Ordering

This embodiment provides a sequence ordering which combines the above two alternatives of hybrid approach. The sequences are first divide into two CM groups with a fixed CM threshold, say 1.2 dB, then within each CM group, the sequences are furthered grouped according to their maximum allowed cyclic shifts values $S_{max}$ at high speed. Alternate $S_{max}$ ordering is used in two CM groups for smooth $S_{max}$ transition at CM group boundaries. Within each $S_{max}$ group, the sequences are ordered according to their CM values, with alternate CM ordering in adjacent $S_{max}$ groups to ensure smooth CM transition at both $S_{max}$ group and CM group boundaries. To facilitate smooth CM transition at both $S_{max}$ group and CM group boundaries, an even number of $S_{max}$ groups is used. Note that sequence order is interpreted cyclic so that the first sequence is consecutive to the last sequence in the ordered sequence set.

Figure 8A:
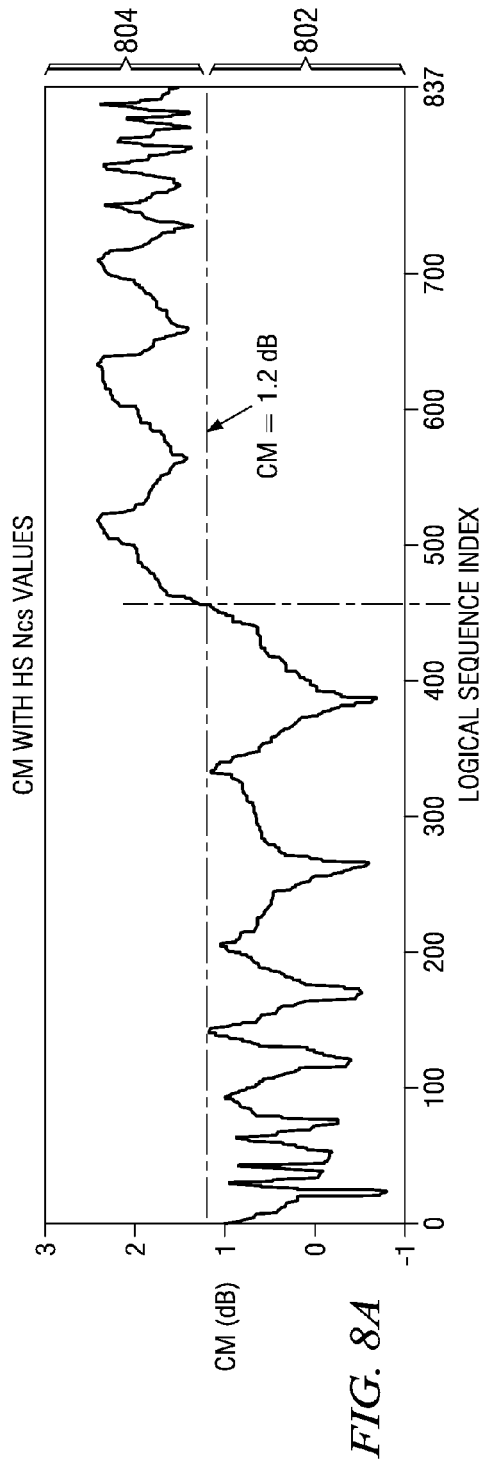
FIG. 8A is a plot illustrating the CM at high speed with combined hybrid sequence ordering.
Figure 8B:
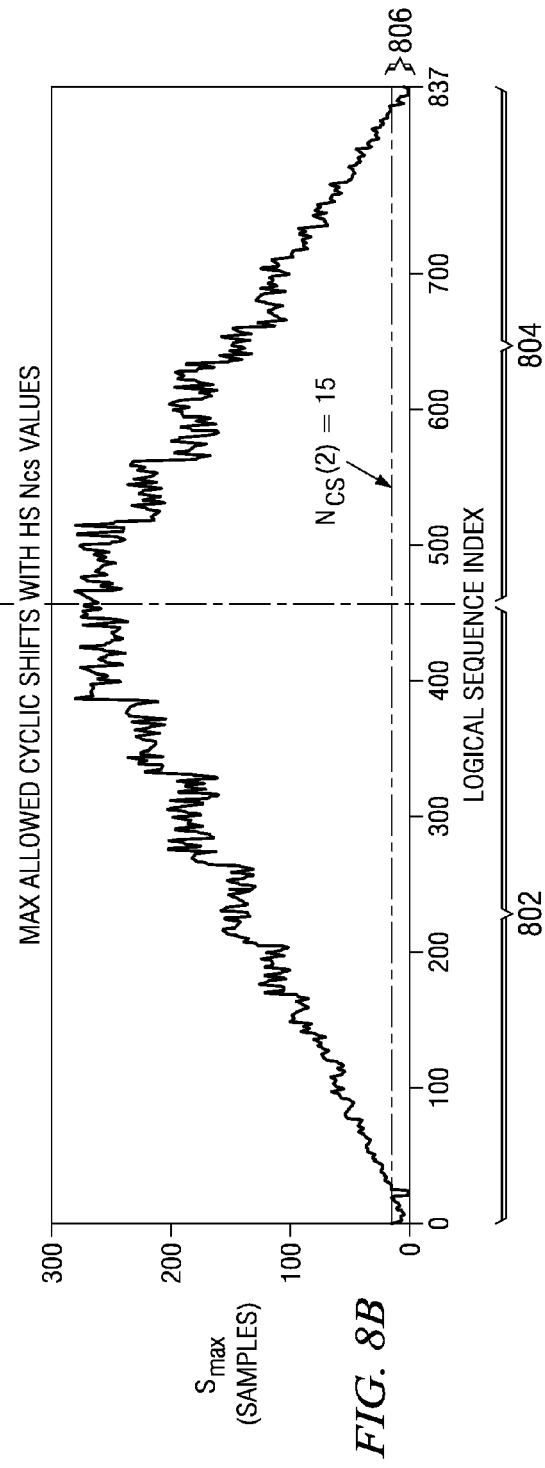
FIG. 8B is a plot illustrating the maximum allowed cyclic shift ($S_{max}$) of the hybrid sequence ordering of the plot of FIG. 8A.

FIG. 8A shows an example of combined hybrid sequence ordering with a ZC sequences of length 839 and a set of 15 high-speed cyclic shift values of {15, 18, 22, 26, 32, 38, 46, 55, 68, 82, 100, 128, 158, 202, 237}. Together with the boundary values, the entire set of 33 $N_{CS}(g)$ values {1, 15, 18, 22, 26, 32, 38, 46, 55, 68, 82, 100, 128, 158, 202, 237, 839, 2237, 202, 158, 128, 100, 82, 68, 55, 46, 38, 32, 26, 22, 18, 15, 1} divide the sequences into 32 groups, with the g-th group satisfying $$N_{CS}(g) \leq S_{max} < N_{CS}(g+1), \text{ for } g=1, \ldots, G+1,$$

and $$N_{CS}(g+1) \leq S_{max} < N_{CS}(g), \text{ for } g=G+2, \ldots, 2G+2,$$

for G=15 and 2(G+1) groups. The set of 15 high-speed cyclic shift values are pre-defined for $S_{max}$-based sequence grouping. A single CM threshold is set to 1.2 dB in this example, such that in the low CM group 802 the sequence are further $S_{max}$-grouped according to increasing $N_{CS}(g)$ values for g=1, ..., 17, and that in the high CM group 804, the sequences are further $S_{max}$-grouped according to decreasing $N_{CS}(g)$ values for g=17, ..., 33, as illustrated in FIG. 8B. Note that in the above set of $N_{CS}(g)$ values, $N_{CS}(g)=N_{CS}(2G+4-g)$ for alternate $S_{max}$ grouping order in two CM groups.

For example, groups 806 formed by $1 \leq S_{max} < 15$ are denoted in FIG. 8B.

Note that with any sequence ordering described above, the group of sequences for planning can be either the entire ordered sequence group or a subset of it in one embodiment.

CM-based Signature Mapping

Figure 7:
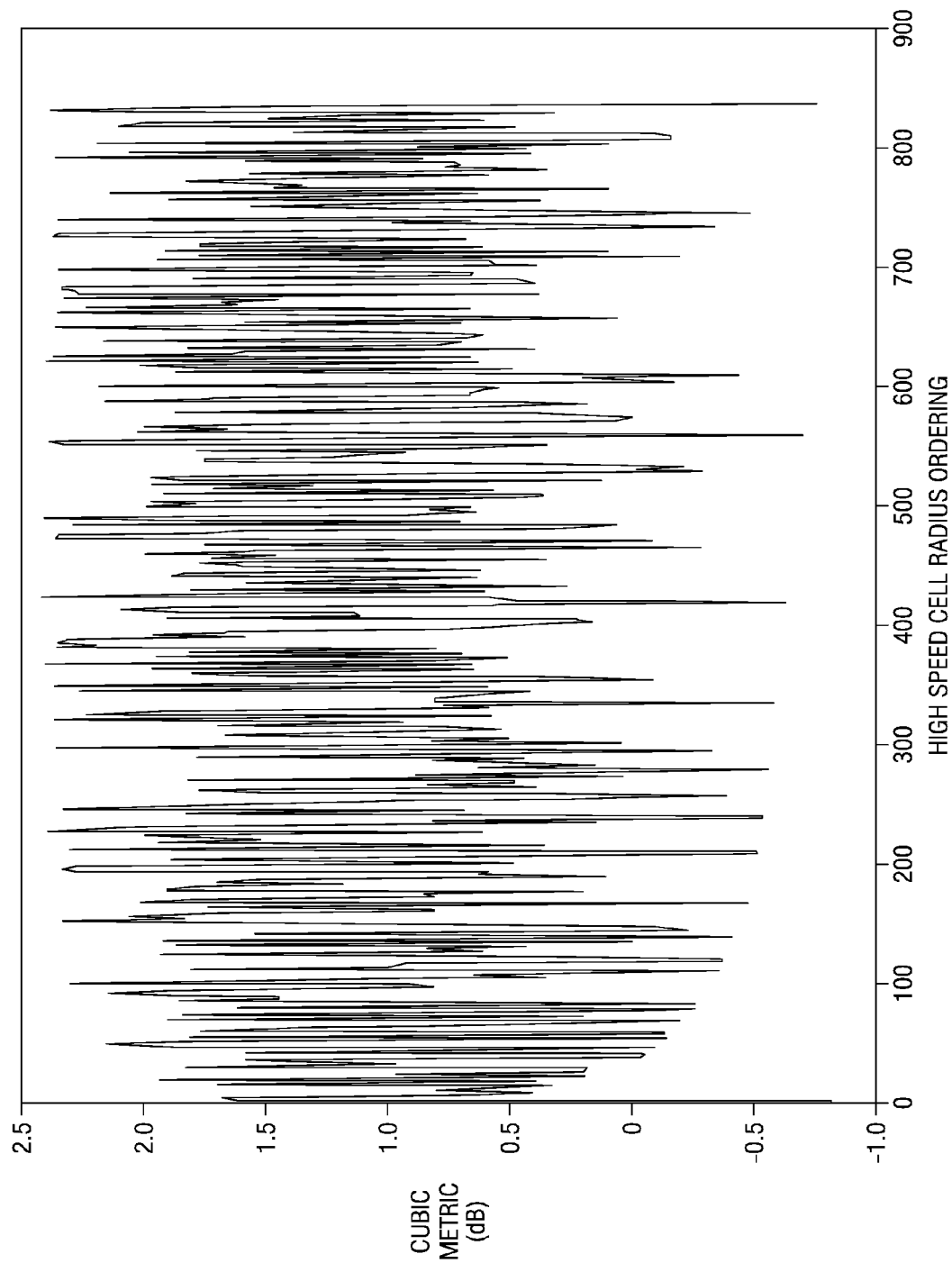
FIG. 7 is a plot illustrating CM of ZC sequences with high-speed cell size ordering.

As shown in FIG. 7, the CM resulting from consecutive ZC sequences with high-speed cell size ordering is almost random within –1 to 2.5 dB. As a result, consecutive root sequences allocated to a given cell may undergo abrupt CM variations. As a result, in order to limit this drawback, the following rules are followed for the set of ordered sequences:

1. Contention-free signatures are mapped onto the root sequences with lowest CM
2. Signatures indicating the small message-3 size are mapped onto the root sequences with intermediate CM
3. Signatures indicating the large message-3 size are mapped onto the root sequences with the largest CM Rule 1 guarantees more robustness to contention-free signatures, which are expected to be used by the most critical random access use cases: handover and fast recovering from DRX in case of new DL data. Rules 2 and 3 address the fact that a UE that requests a small message-3 allocation is likely in poorer radio conditions than a UE requesting a large message-3 size, and therefore a lower CM will help the former in having a successful PRACH transmission.

Hybrid Sequence Ordering with CM-based Signature Mapping

In this embodiment, the above combined hybrid sequence ordering is further improved in light of the signature mapping issue discussed above. By doing so, the robustness of "prioritization" of signatures depending on their use cases is added on top of the benefit of the hybrid approach.

Signature Mapping of a Constant Number (64) of Signatures

Figure 9:
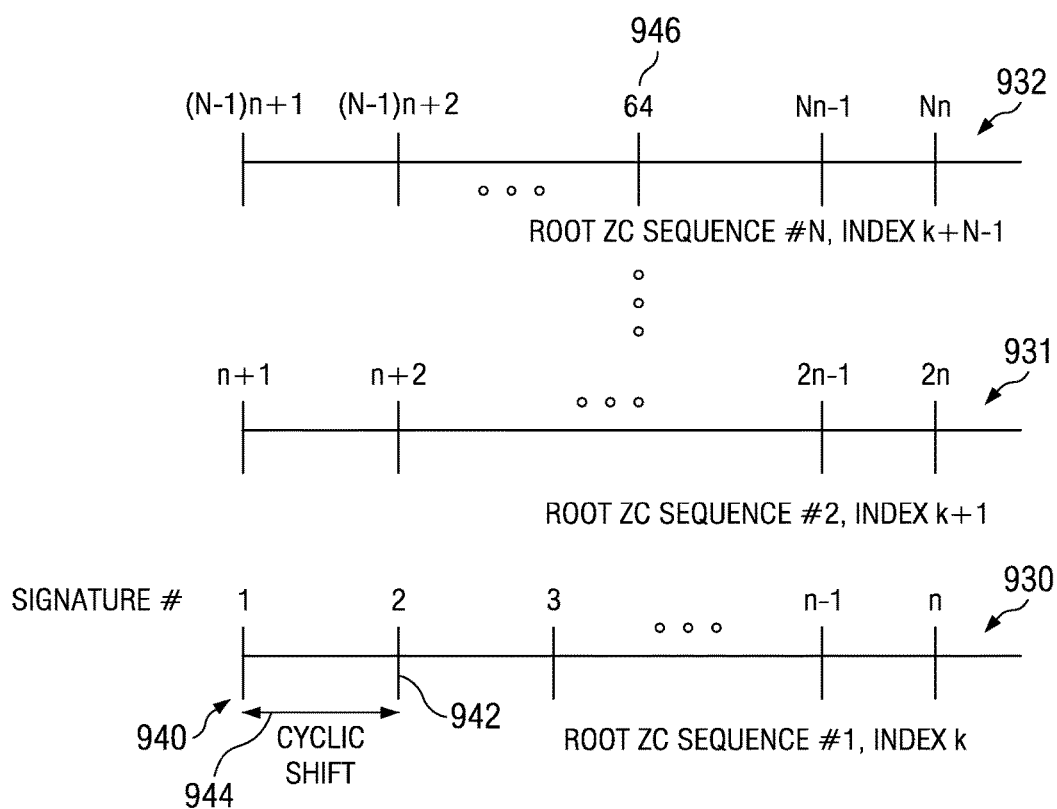
FIG. 9 illustrates mapping of signature opportunity onto physical CS-ZC sequences.

FIG. 9 illustrates a scheme for mapping sixty-four signatures. Sixty-four signatures are mapped onto sixty-four cyclic shifts available from N root sequences. It is assumed the signature opportunity indexes are mapped onto the cyclic shifted ZC sequences in low speed cells as follows: signature #1 940 is mapped onto the first ZC sequence 930 in the list; signature sequence #2 942 is mapped onto the same ZC sequence, right-cyclic-shifted by the cyclic shift value 944 (or increment); subsequent signatures #3 to n are similarly incrementally mapped onto subsequent right-cyclic-shifted versions of the same ZC sequence until all possible n cyclic shifts have been obtained. Then, signature #n+1 is mapped onto the next ZC sequence 931 in the list, and the following signatures are mapped onto its subsequent right-cyclic-shifted versions. This signature mapping is repeated over all ZC root sequences 932 and stops at sequence #64 946 when 64 sequences were generated. In case of high speed cells, cyclic shift restrictions apply (as described with respect to Conditions #1 and #2 above) so that some cyclic shifts skipped.

Mapping of contention-free signatures will now be discussed, as well as the two contention-based signature sets indicating the size of message-3 of the Random Access procedure. When there always are a constant number of signatures mapped onto the cyclic shifts of the root sequences, the three above signature sets have to share this total number of signatures. The three sets are allocated so as to prioritize the signature robustness depending on their use case, as discussed above:

Contention-free signatures are mapped onto the root sequences with lowest CM

Figure 10:
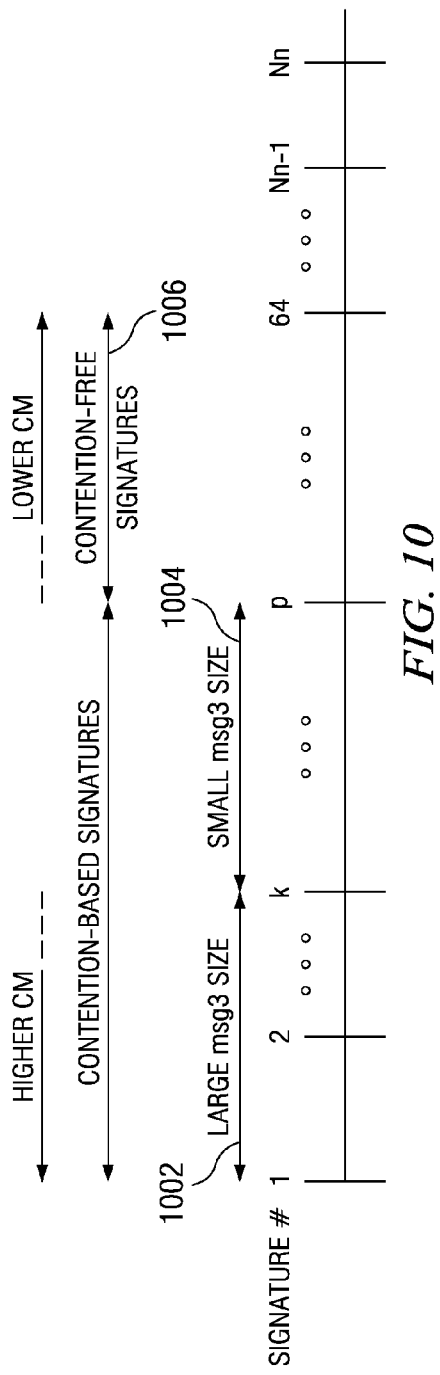
FIG. 10 illustrates mapping of contention-based signature sets used for message-3 size indication and contention-free signatures in which contention-free signatures are mapped last.
Figure 11:
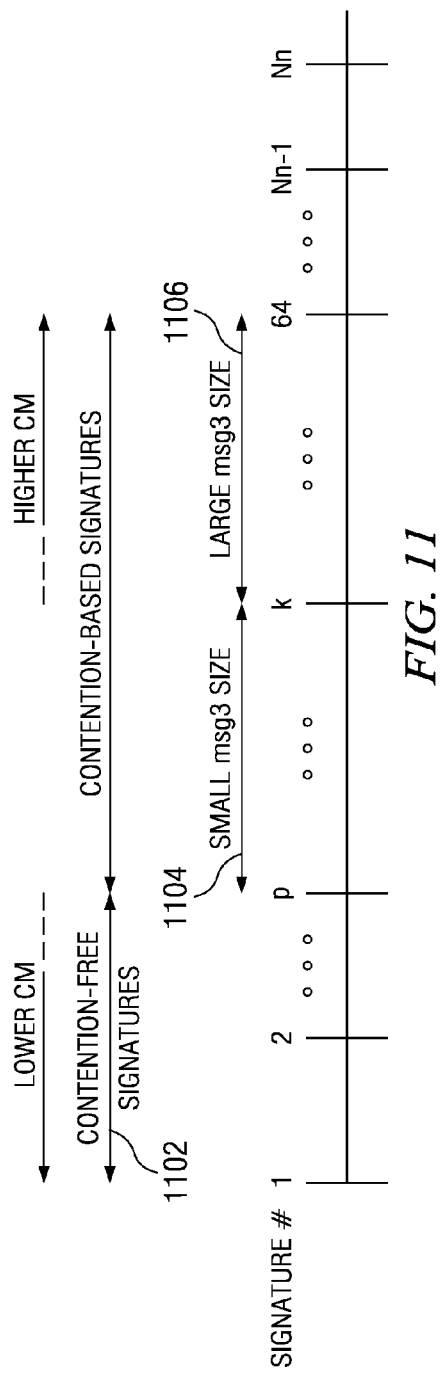
FIG. 11 illustrates mapping of contention-based signature sets used for message-3 size indication and contention-free signatures in which contention-free signatures are mapped first.

Signatures indicating the small message 3 size are mapped onto the root sequences with intermediate CM Signatures indicating the large message 3 size are mapped onto the root sequences with the largest CM As shown in FIGS. 10 and 11 where all available cyclic shifts across root sequences are projected on a single axis for simplicity, this leads to two possible mappings for contention-based signatures and contention-free signatures, as follows.

In one scheme, contention-based signatures, starting with the signature set 1002 indicating the large message-3 size are allocated first, then contention-based signature set 1004 indicating the small message-3 size, and finally contention-free signatures 1006, as illustrated in FIG. 10. In this case, the ZC sequences within an $S_{max}$ group must be ordered by decreasing CM.

In another scheme, contention-free signatures 1102 are allocated first, then contention-based signatures, starting with the signature set 1104 indicating the small message 3 size, and finally contention-based signature set 1106 indicating the large message 3 size, as illustrated in FIG. 11. In this case, the ZC sequences within an $S_{max}$ group must be ordered by increasing CM.

Signature Mapping of a Non-constant Number Signatures

Figure 12:
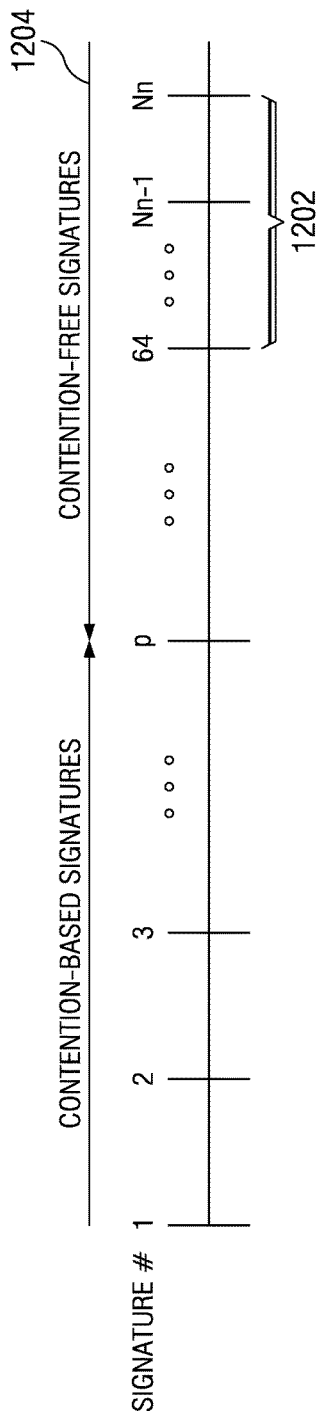
FIG. 12 illustrates mapping of contention-free and contention-based signatures.
Figure 13:
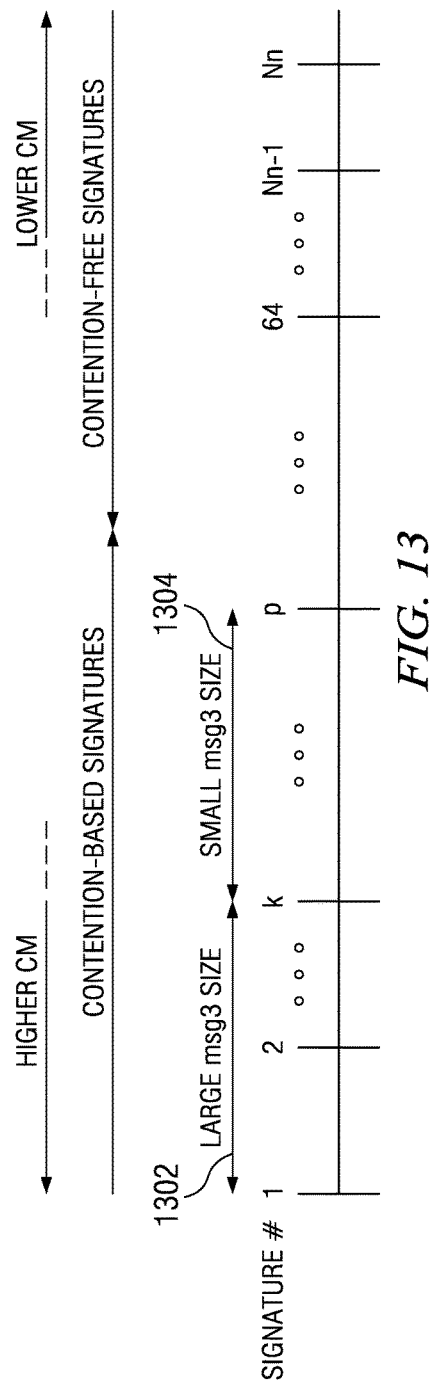
FIG. 13 illustrates mapping of contention-based signature sets used for message-3 size indication and contention-free signatures.

As illustrated in FIG. 12, when there is an uneven number of cyclic shifts per root sequence to get the 64 signatures, some remaining cyclic shifts 1202 are available at the end of the last root sequence. These can be used for contention-free signatures, so that contention-free signatures puncture less contention-based signature space. Therefore, if signatures need to be reserved for contention-free access, a simple solution to take advantage of these available cyclic shifts is to allocate these signatures backward starting from the last available cyclic shift of the last root sequence, as indicated at 1204. Then, the mapping of contention-based signature sets indicating the size of message-3 of the Random Access procedure, is done as described above for a constant number of signatures. As Illustrated in FIG. 13 for one embodiment, the signature set 1302 indicating a large message-3 size is mapped onto the indexes of the contention-based signatures with higher CM values, and the signature set 1304 indicating a small message-3 size is mapped onto the remaining contention-based signatures with lower CM values.

Hybrid Sequence Ordering in Time and Frequency Domain

In E-UTRA networks, high-speed random access is supported with an additional set of cyclic shift values for cells of size up to 30 km in radius. This embodiment provides the corresponding sequence ordering in frequency domain based on the time-domain Zadoff-Chu (ZC) sequence ordering by assuming ZC sequences are applied in frequency domain directly. The sequence ordering in time domain is derived without using any transmit filter, along with its dual ordering in frequency domain. The dual ZC sequence index mapping is based on the principle that a ZC sequence with generating index u in time domain corresponds to a rotated and scaled ZC sequence in frequency domain with a generating index v of:

$$(u \cdot v = -1) \bmod N_{ZC}, \text{ or equivalently,}$$

$$(u \cdot v = N_{ZC} - 1) \bmod N_{ZC},$$

where $(\cdot) \bmod N_{ZC}$ denotes modulo $N_{ZC}$ operation and $N_{ZC}$ is the ZC sequence length of a prime number.

Table 1 lists the time-domain ZC sequence hybrid ordering when assuming no transmit filter. Table 2 lists the frequency-domain ZC sequence hybrid ordering corresponding to the ordering in Table 1.

TABLE 1

Mapping from logical index to generating index for time-domain ZC sequences.

| CM grp | $S_{max}$ grp | $N_{CS}$ (HS) | Logical index | Generating index |
|---|---|---|---|---|
| Low | 1 | — | 0~23 | 129 710 140 699 120 719 210 629 168 671 84 755 105 734 93 746 70 769 60 779 2 837 1 838 |
| | 2 | 15 | 24~29 | 56 783 112 727 148 691 |
| | 3 | 18 | 30~35 | 80 759 42 797 40 799 |
| | 4 | 22 | 36~41 | 35 804 73 766 146 693 |
| | 5 | 26 | 42~51 | 31 808 28 811 30 809 27 812 29 810 |
| | 6 | 32 | 52~63 | 24 815 48 791 68 771 74 765 178 661 136 703 |
| | 7 | 38 | 64~75 | 86 753 78 761 43 796 39 800 20 819 21 818 |
| | 8 | 46 | 76~89 | 95 744 202 637 190 649 181 658 137 702 125 714 151 688 |
| | 9 | 55 | 90~115 | 217 622 128 711 142 697 122 717 203 636 118 721 110 729 89 750 103 736 61 778 55 784 15 824 14 825 |
| | 10 | 68 | 116~135 | 12 827 23 816 34 805 37 802 46 793 207 632 179 660 145 694 130 709 223 616 |
| | 11 | 82 | 136~167 | 228 611 227 612 132 707 133 706 143 696 135 704 161 678 201 638 173 666 106 733 83 756 91 748 66 773 53 786 10 829 9 830 |
| | 12 | 100 | 168~203 | 7 832 8 831 16 823 47 792 64 775 57 782 104 735 101 738 108 731 208 631 184 655 197 642 191 648 121 718 141 698 149 690 216 623 218 621 |
| | 13 | 128 | 204~263 | 152 687 144 695 134 705 138 701 199 640 162 677 176 663 119 720 158 681 164 675 174 665 171 668 170 669 87 752 169 670 88 751 107 732 81 758 82 757 100 739 98 741 71 768 59 780 65 774 50 789 49 790 26 813 17 822 13 826 6 833 |
| | 14 | 158 | 264~327 | 5 834 33 806 51 788 75 764 99 740 96 743 97 742 166 673 172 667 175 664 187 652 163 676 185 654 200 639 114 725 189 650 115 724 194 645 195 644 192 647 182 657 157 682 156 683 211 628 154 685 123 716 139 700 212 627 153 686 213 626 215 624 150 689 |
| | 15 | 202 | 328~383 | 225 614 224 615 221 618 220 619 127 712 147 692 124 715 193 646 205 634 206 633 116 723 160 679 186 653 167 672 79 760 85 754 77 762 92 747 58 781 62 777 69 770 54 785 36 803 32 807 25 814 18 821 11 828 4 835 |
| | 16 | 237 | 384~455 | 3 836 19 820 22 817 41 798 38 801 44 795 52 787 45 794 63 776 67 772 72 767 76 763 94 745 102 737 90 749 109 730 165 674 111 728 209 630 204 635 117 722 188 651 159 680 198 641 113 726 183 656 180 659 177 662 196 643 155 684 214 625 126 713 131 708 219 620 222 617 226 613 |
| High | 17 | 237 | 456~513 | 230 609 232 607 262 577 252 587 418 421 416 423 413 426 411 428 376 463 395 444 283 556 285 554 379 460 390 449 363 476 384 455 388 451 386 453 361 478 387 452 360 479 310 529 354 485 328 511 315 524 337 502 349 490 335 504 324 515 |
| | 18 | 202 | 514~561 | 323 516 320 519 334 505 359 480 295 544 385 454 292 547 291 548 381 458 399 440 380 459 397 442 369 470 377 462 410 429 407 432 281 558 414 425 247 592 277 562 271 568 272 567 264 575 259 580 |
| | 19 | 158 | 562~629 | 237 602 239 600 244 595 243 596 275 564 278 561 250 589 246 593 417 422 248 591 394 445 393 446 370 469 365 474 300 539 299 540 364 475 362 477 298 541 312 527 313 526 314 525 353 486 352 487 343 496 327 512 350 489 326 513 319 520 332 507 333 506 348 491 347 492 322 517 |

TABLE 1-continued

Mapping from logical index to generating index for time-domain ZC sequences.

| CM grp | $S_{max}$ grp | $N_{CS}$ (HS) | Logical index | Generating index |
|---|---|---|---|---|
|  | 20 | 128 | 630~659 | 330 509 338 501 341 498 340 499 342 497 301 538 366 473 401 438 371 468 408 431 375 464 249 590 269 570 238 601 234 605 |
|  | 21 | 100 | 660~707 | 257 582 273 566 255 584 254 585 245 594 251 588 412 427 372 467 282 557 403 436 396 443 392 447 391 448 382 457 389 450 294 545 297 542 311 528 344 495 345 494 318 521 331 508 325 514 321 518 |
|  | 22 | 82 | 708~729 | 346 493 339 500 351 488 306 533 289 550 400 439 378 461 374 465 415 424 270 569 241 598 |
|  | 23 | 68 | 730~751 | 231 608 260 579 268 571 276 563 409 430 398 441 290 549 304 535 308 531 358 481 316 523 |
|  | 24 | 55 | 752~765 | 293 546 288 551 284 555 368 471 253 586 256 583 263 576 |
|  | 25 | 46 | 766~777 | 242 597 274 565 402 437 383 456 357 482 329 510 |
|  | 26 | 38 | 778~789 | 317 522 307 532 286 553 287 552 266 573 261 578 |
|  | 27 | 32 | 790~795 | 236 603 303 536 356 483 |
|  | 28 | 26 | 796~803 | 355 484 405 434 404 435 406 433 |
|  | 29 | 22 | 804~809 | 235 604 267 572 302 537 |
|  | 30 | 18 | 810~815 | 309 530 265 574 233 606 |
|  | 31 | 15 | 816~819 | 367 472 296 543 |
|  | 32 | — | 820~837 | 336 503 305 534 373 466 280 559 279 560 419 420 240 599 258 581 229 610 |

TABLE 2

Mapping from logical index to generating index for frequency-domain ZC sequences.

| CM grp | $S_{max}$ grp | $N_{CS}$ (HS) | Logical index | Generating index |
|---|---|---|---|---|
| Low | 1 | — | 0~23 | 13 826 6 833 7 832 4 835 5 834 10 829 8 831 415 424 12 827 14 825 419 420 1 838 |
|  | 2 | 15 | 24~29 | 15 824 412 427 17 822 |
|  | 3 | 18 | 30~35 | 409 430 20 819 21 818 |
|  | 4 | 22 | 36~41 | 24 815 23 816 408 431 |
|  | 5 | 26 | 42~51 | 406 433 30 809 28 811 404 435 405 434 |
|  | 6 | 32 | 52~63 | 35 804 402 437 37 802 34 805 33 806 401 438 |
|  | 7 | 38 | 64~75 | 400 439 398 441 39 800 43 796 42 797 40 799 |
|  | 8 | 46 | 76~89 | 53 786 54 785 393 446 394 445 49 790 396 443 50 789 |
|  | 9 | 55 | 90~115 | 58 781 59 780 65 774 392 447 62 777 64 775 389 450 66 773 391 448 55 784 61 778 56 783 60 779 |
|  | 10 | 68 | 116~135 | 70 769 73 766 74 765 68 771 383 456 381 458 75 764 81 758 71 768 380 459 |
|  | 11 | 82 | 136~167 | 92 747 377 462 375 464 82 757 88 751 87 752 370 469 96 743 97 742 372 467 374 465 378 461 89 750 95 744 84 755 373 466 |
|  | 12 | 100 | 168~203 | 120 719 105 734 367 472 357 482 118 721 368 471 121 718 108 731 101 738 359 480 114 725 362 477 123 716 104 735 119 720 366 473 369 470 127 712 |
|  | 13 | 128 | 204~263 | 138 701 134 705 144 695 152 687 156 683 347 492 348 491 141 698 154 685 353 486 352 487 157 682 153 686 135 704 139 700 143 696 345 494 145 694 133 706 344 495 351 488 130 709 128 711 142 697 151 688 137 702 355 484 148 691 129 710 140 699 |
|  | 14 | 158 | 264~327 | 168 671 178 661 329 510 179 660 339 500 201 638 173 666 187 652 200 639 163 676 166 673 175 664 322 517 172 667 184 655 182 657 321 518 333 506 327 512 319 520 189 650 171 668 199 860 167 672 158 681 191 648 169 670 186 653 170 669 323 516 160 679 330 509 |
|  | 15 | 202 | 328~383 | 220 619 206 633 205 634 225 614 218 621 234 605 318 521 313 526 221 618 224 615 311 528 215 624 212 627 211 628 308 531 306 533 316 523 228 611 217 6822 203 636 304 536 202 637 303 536 236 603 302 537 233 606 305 534 210 629 |
|  | 16 | 237 | 384~455 | 280 559 265 574 267 572 266 573 287 552 286 553 242 597 261 578 293 546 288 551 268 571 276 563 241 593 255 584 289 550 254 585 300 539 257 582 281 558 292 547 294 545 299 540 248 591 250 589 297 |

TABLE 2-continued

Mapping from logical index to generating index for frequency-domain ZC sequences.

| CM grp | $S_{max}$ grp | $N_{CS}$ (HS) | Logical index | Generating index |
|---|---|---|---|---|
| High | 17 | 237 | 456~513 | 542 298 541 275 564 237 602 244 595 249 590 247 592 273 566 269 570 272 567 291 548 271 568 259 588 264 575 285 554 283 556 279 560 240 599 258 581 296 543 270 569 274 565 252 587 262 577 290 549 256 583 245 594 260 579 253 586 263 576 251 588 284 555 282 557 295 544 301 538 243 598 277 562 239 600 238 601 278 561 246 593 |
|  | 18 | 202 | 514~561 | 213 626 312 527 314 525 208 631 310 529 231 608 204 635 222 617 207 632 307 532 223 616 317 522 216 623 227 612 309 530 235 604 209 630 229 610 214 625 315 524 226 613 219 620 232 607 230 609 |
|  | 19 | 158 | 562~629 | 177 662 337 502 196 643 328 511 180 659 335 504 198 641 324 515 336 503 159 680 181 658 190 649 161 678 331 508 165 674 188 651 325 514 197 642 183 656 320 519 193 646 334 505 164 675 174 665 340 499 195 644 338 501 332 507 192 647 326 513 194 645 176 663 162 677 185 654 |
|  | 20 | 128 | 630~659 | 150 689 350 489 342 497 343 496 341 498 354 485 149 690 136 703 346 493 146 693 132 707 155 684 131 708 349 490 147 692 |
|  | 21 | 100 | 660~707 | 111 728 126 713 102 737 109 730 363 476 361 478 112 727 106 733 360 479 356 483 125 714 122 717 103 736 358 481 110 729 117 722 113 726 116 723 100 739 107 732 124 715 365 474 364 475 115 724 |
|  | 22 | 82 | 708~729 | 371 468 99 740 98 741 85 754 90 749 86 753 91 748 83 756 93 746 376 463 94 745 |
|  | 23 | 68 | 730~751 | 385 454 384 455 72 767 76 763 80 759 78 761 379 460 69 770 79 760 382 457 77 762 |
|  | 24 | 55 | 752~765 | 63 776 67 772 387 452 57 782 388 451 390 449 386 453 |
|  | 25 | 46 | 766~777 | 52 787 395 444 48 791 46 793 47 792 51 788 |
|  | 26 | 38 | 778~789 | 397 442 399 440 44 795 38 801 41 798 45 794 |
|  | 27 | 32 | 790~795 | 32 807 36 803 403 436 |
|  | 28 | 26 | 796~803 | 26 813 29 810 27 812 31 808 |
|  | 29 | 22 | 804~809 | 407 432 22 817 25 814 |
|  | 30 | 18 | 810~815 | 410 429 19 820 18 821 |
|  | 31 | 15 | 816~819 | 16 823 411 428 |
|  | 32 | — | 820~837 | 417 422 11 828 9 830 3 836 418 421 2 837 416 423 413 426 414 425 |

Note that in Tables 1 and Table 2, the logic index can start either from 1 or 0 in various embodiments. It should also be noted that in Tables 1 and 2 it is assumed that pair-wise sequence assignment is employed, that is, sequence indices u and $N_{zc}$–u are listed together in pairs. The pair ordering can be either u and $N_{zc}$–u, or $N_{zc}$–u and u, though the former is assumed in all the tables above. In addition, any cyclic shift of sequence ordering as listed in these tables, in either clock-wise or counter clock-wise direction, or a one-to-one mapping of the provided ordering through a transformation, can be used without violating the sequence ordering rules as agreed in 3GPP R1-074514, "Way forward proposal on PRACH sequence ordering," Shanghai, China, Oct. 8-12, 2007.

Figure 14:
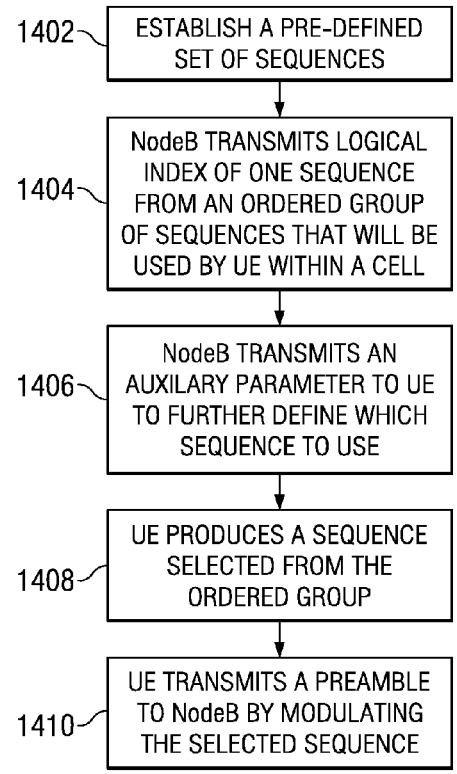
FIG. 14 is a flow diagram illustrating operation of a signaling process for selecting a preamble configuration for transmission of the preamble of FIG. 3.

FIG. 14 is a flow diagram illustrating operation of a signaling process for selecting a preamble configuration for transmission of the preamble of FIG. 3. For a particular cell served by a particular eNB, a pre-defined set of sequences is defined 1402 according to one of the various schemes described above with respect to FIGS. 5-9. In one embodiment, all of the cells within a network will use the same pre-defined set of sequences. In other embodiments, various parts of a network may use different pre-defined set of sequences. In an embodiment of a large network, the pre-defined set of sequences may span all 839 sequences, while in an embodiment of a small network only a portion of the entire set may be used.

As described in more detail above, a sequence length of 839 is assumed in the present embodiment which means that ten bits are required to signal one Zadoff-Chu generating index. Given that up to 64 sequences may need to be signaled within one cell, it is highly desirable to minimize the associated overhead due to signaling multiple sequences. This is achieved by signaling 1404 only one logical index from the eNB serving the cell to UE within the cell. The eNB also transmits 1406 one or more auxiliary parameters to a particular UE that defines which sequence or set of sequences that UE is to use for transmission.

Each UE then produces 1408 the subsequent sequences according to the pre-defined ordering of sequences. Each ZC sequence has a unique logical index. The ordering of sequences is identified by the logical indexes of the sequences, with each logical index uniquely mapped to a generating index. Depending on its mode of operation, a UE may use from one to sixty four sequences for transmission. For example, suppose a UE has been scheduled by the eNB to use four sequences and the eNB has transmitted "74" as the indication of the logical index of the first sequence. The UE then must produce the remaining three sequences by selecting them from an ordered group of sequences using the received indication of the logical index of the first sequence and using the auxiliary parameter, wherein the ordered group of sequences is a proper subset of the pre-defined set of sequences.

The UE then produces 1410 a transmission signal that includes the preamble structure by modulating a designated one of the sequences that were assigned to it by the process described above. The transmission signal is transmitted to the eNB during an allocated time slot as described in more detail with respect to FIGS. 2-4 and FIG. 15.

Figure 15:
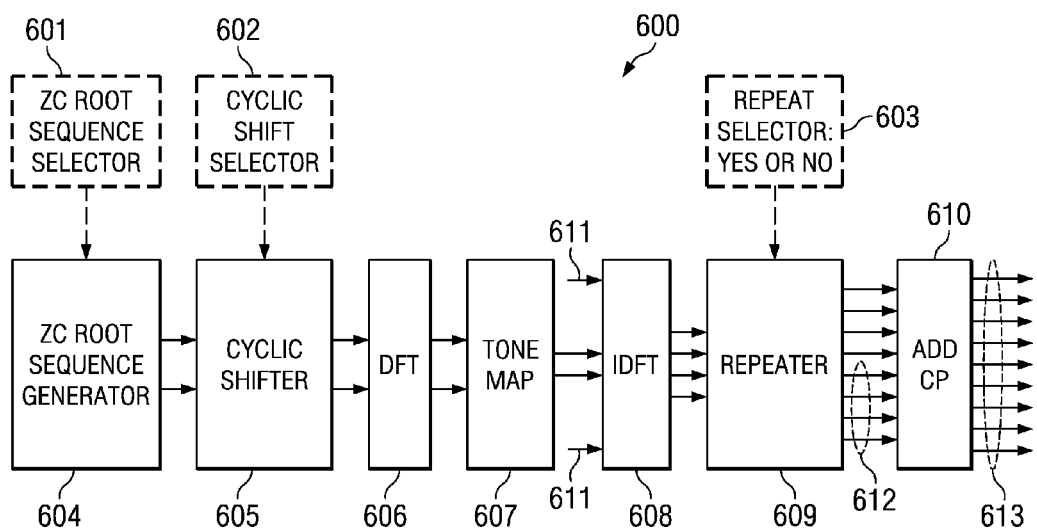
FIG. 15 is a block diagram of an illustrative transmitter for transmitting the preamble structure of FIG. 3.

FIG. 15 is a block diagram of an illustrative transmitter 600 for transmitting the preamble structure of FIG. 3. Apparatus 600 comprises ZC Root Sequence Selector 601, Cyclic Shift Selector 602, Repeat Selector 603, ZC Root Sequence Generator 604, Cyclic Shifter 605, Discrete Fourier Transform (DFT) in 606, Tone Map 607, other signals or zero-padding in 611, Inverse Discrete Fourier Transform (IDFT) in 608, Repeater in 609, optional repeated samples 612, Add CP in 610, and the PRACH signal in 613. Elements of the apparatus may be implemented as components in a fixed or programmable processor. In some embodiments, the IDFT block in 608 may be implemented using an Inverse Fast Fourier Transform (IFFT), and the DFT block in 606 may be implemented using a Fast Fourier Transform (FFT).

Apparatus 600 is used to select and perform the PRACH preamble signal transmission as follows. As was described in more detail above, a pre-defined set of sequences is defined according to one of the various schemes described above with respect to FIGS. 5-9. An ordered group of sequences that is a proper subset of the pre-defined set of sequences is used within a particular cell. Upon entering the cell, a UE receives an indication of a logical index for a first sequence, wherein the first sequence belongs to the ordered group of sequences and an indication of an auxiliary parameter that further describes the amount of cyclic shift to use. The UE performs selection of the CAZAC (e.g. ZC) root sequence using the ZC root sequence selector module 601 and the selection of the cyclic shift value using the cyclic shift selector module 602. The sequence is selected from the ordered group of sequences using the received indication of the logical index of the first sequence and using the auxiliary parameter, as was described in more detail above.

Next, the UE generates the ZC sequence using the ZC root sequence generator 604 using the generation index of the selected sequence. Then, if necessary, the UE performs cyclic shifting of the selected ZC sequence using the Cyclic Shifter 605. The UE performs DFT (Discrete Fourier Transform) of the cyclically shifted ZC sequence in DFT 606. The result of the DFT operation is mapped onto a designated set of tones (sub-carriers) using the Tone Map 607. Additional signals or zero-padding 611, may or may not be present. The UE next performs IDFT of the mapped signal using the IDFT 608. The size of the IDFT in 608 may optionally be larger than the size of DFT in 606.

In other embodiments, the order of cyclic shifter 605, DFT 606, tone map 607 and IDFT 608 may be arranged in various combinations. For example, in one embodiment a DFT operation is performed on a selected root sequence, tone mapping is then performed, an IDFT is performed on the mapped tones and then the cyclic shift may be performed. In another embodiment, tone mapping is performed on the root sequence and then an IDFT is performed on the mapped tones and then a cyclic shift is performed.

In this disclosure, the cyclically shifted or phase ramped CAZAC-like sequence is sometimes denoted as cyclic shifted base sequence, cyclic shifted root sequence, phase ramped base sequence, phase ramped root sequence, or any other equivalent term. In other places, the CAZAC-like sequence is generally referred to as the second sequence.

Figure 16:
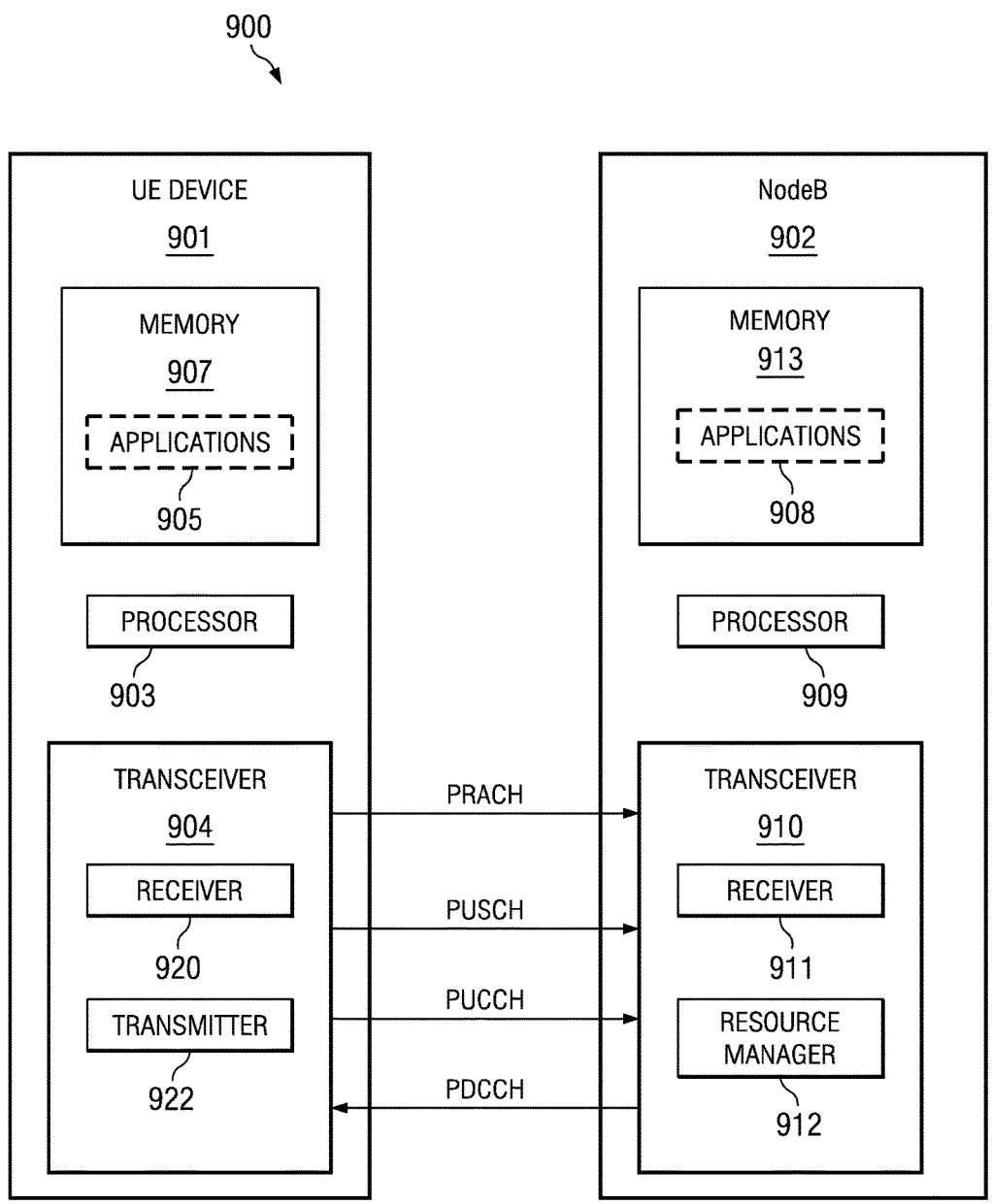
FIG. 16 is a block diagram Illustrating the network system of FIG. 1.

FIG. 16 is a block diagram illustrating the network system of FIG. 1. As shown in FIG. 16, the wireless networking system 900 comprises a mobile UE device 901 in communication with an eNB 902. The mobile UE device 901 may represent any of a variety of devices such as a server, a desktop computer, a laptop computer, a cellular phone, a Personal Digital Assistant (PDA), a smart phone or other electronic devices. In some embodiments, the electronic mobile UE device 901 communicates with the eNB 902 based on a LTE or E-UTRAN protocol. Alternatively, another communication protocol now known or later developed can be used.

As shown, the mobile UE device 901 comprises a processor 903 coupled to a memory 907 and a Transceiver 904. The memory 907 stores (software) applications 905 for execution by the processor 903. The applications 905 could comprise any known or future application useful for individuals or organizations. As an example, such applications 905 could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications 905, at least some of the applications 905 may direct the mobile UE device 901 to transmit UL signals to the eNB (base-station) 902 periodically or continuously via the transceiver 904. In at least some embodiments, the mobile UE device 901 identifies a Quality of Service (QoS) requirement when requesting an uplink resource from the eNB 902. In some cases, the QoS requirement may be implicitly derived by the eNB 902 from the type of traffic supported by the mobile UE device 901. As an example, VOIP and gaming applications often involve low-latency uplink (UL) transmissions while High Throughput (HTP)/Hypertext Transmission Protocol (HTTP) traffic can involve high-latency uplink transmissions.

Transceiver 904 includes uplink logic which may be implemented by execution of instructions that control the operation of the transceiver. Some of these instructions may be stored in memory 907 and executed when needed. As would be understood by one of skill in the art, the components of the Uplink Logic may involve the physical (PHY) layer and/or the Media Access Control (MAC) layer of the transceiver 904. Transceiver 904 includes one or more receivers 920 and one or more transmitters 922. The transmitter(s) may be embodied as described with respect to FIG. 14. In particular, as described above, in more detail, a pre-defined set of sequences is defined according to one of the various schemes described above with respect to FIGS. 5-9. An ordered group of sequences that is a proper subset of the pre-defined set of sequences is used within a particular cell. Upon entering the cell, a UE receives an indication of a logical index for a first sequence from eNB 902, wherein the first sequence belongs to the ordered group of sequences and an indication of an auxiliary parameter that further describes the amount of cyclic shift to use. Transceiver module 904 produces a second sequence using the received indication of the logical index of the first sequence and using the auxiliary parameter, by selecting the second sequence from the ordered group of sequences. Transmitter module 922 produces a transmission signal by modulating the second sequence to form a PRACH preamble, as described in more detail above.

As shown in FIG. 16, the eNB 902 comprises a Processor 909 coupled to a memory 913 and a transceiver 910. The memory 913 stores applications 908 for execution by the processor 909. The applications 908 could comprise any known or future application useful for managing wireless communications. At least some of the applications 908 may direct the base-station to manage transmissions to or from the user device 901.

Transceiver 910 comprises an uplink Resource Manager 912, which enables the eNB 902 to selectively allocate uplink PUSCH resources to the user device 901. As would be understood by one of skill in the art, the components of the uplink resource manager 912 may involve the physical (PHY) layer and/or the Media Access Control (MAC) layer of the transceiver 910. Transceiver 910 includes a Receiver 911 for receiving transmissions from various UE within range of the eNB.

Uplink resource manager 912 executes instructions that control the operation of transceiver 910. Some of these instructions may be located in memory 913 and executed when needed. Resource manager 912 controls the transmission resources allocated to each UE that is being served by eNB 902 and broadcasts control information via the physical downlink control channel PDCCH. In particular, eNB 902 selects a second sequence to be assigned to UE 901 within a cell served by eNB 902 from the pre-defined set of sequences. As was described in more detail above, the second sequence is selected from an ordered group of sequences, containing at least a first sequence, that is a proper subset of the pre-defined set of sequences. Transceiver 910 transmits an indication of a logical index for the first sequence to UE 901 along with an indication of an auxiliary parameter; the auxiliary parameter and the indication of the logical index of the first sequence together identify a logical index of the second sequence. At some later point in time, eNB 902 receives a PRACH preamble transmission signal from the UE containing a modulated second sequence.

Figure 17:
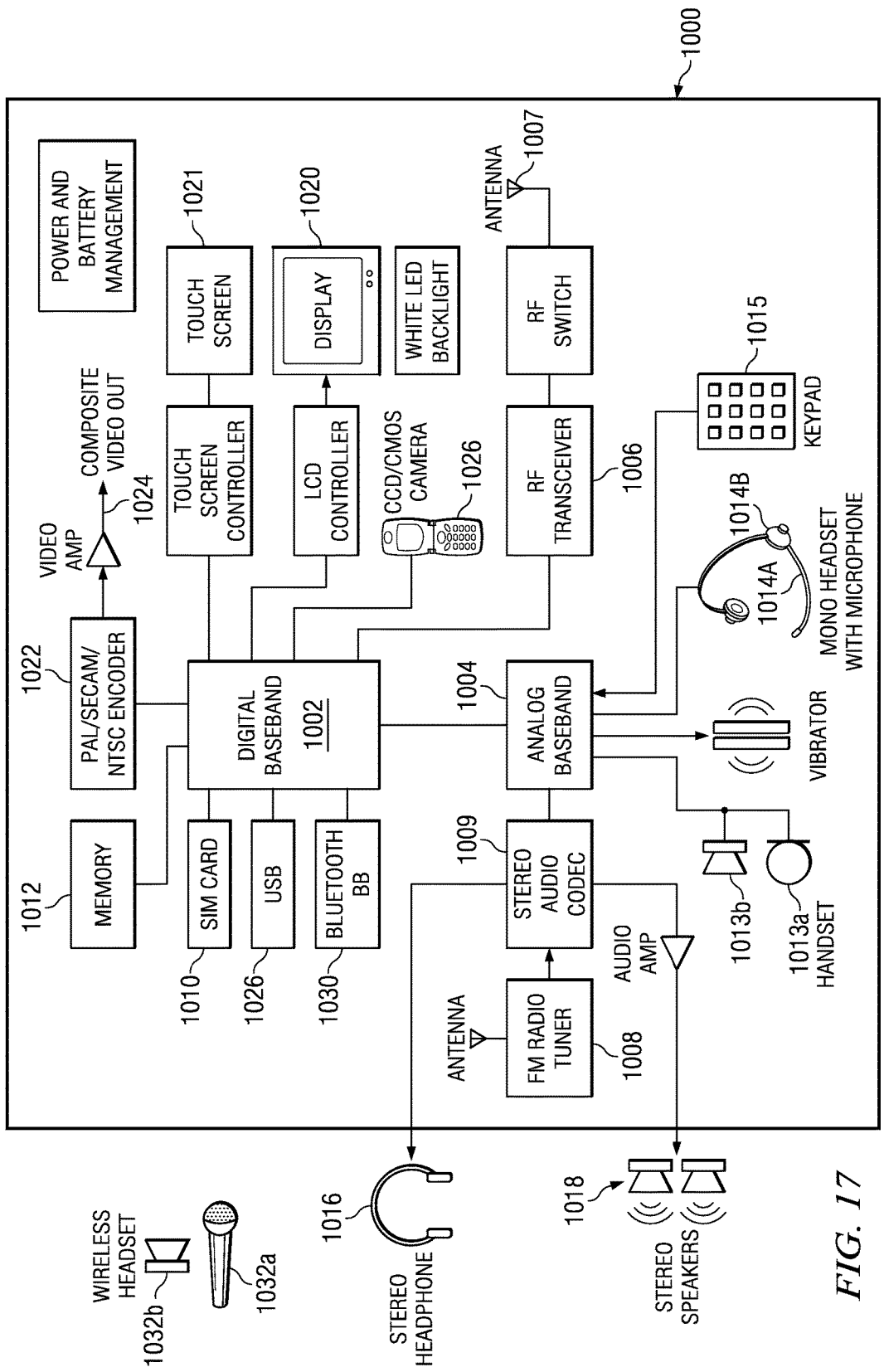
FIG. 17 is a block diagram of a cellular phone for use in the network of FIG. 1.

FIG. 17 is a block diagram of a UE 1000 that stores a fixed set of preamble parameter configurations for use across a complete range of cell sizes within the cellular network, as described above. Digital system 1000 is a representative cell phone that is used by a mobile user. Digital baseband (DBB) unit 1002 is a digital processing processor system that includes embedded memory and security features.

Analog baseband (ABB) unit 1004 performs processing on audio data received from stereo audio codec (coder/decoder) 1009. Audio codec 1009 receives an audio stream from FM Radio tuner 1008 and sends an audio stream to stereo headset 1016 and/or stereo speakers 1018. In other embodiments, there may be other sources of an audio stream, such a compact disc (CD) player, a solid state memory module, etc. ABB 1004 receives a voice data stream from handset microphone 1013*a* and sends a voice data stream to handset mono speaker 1013*b*. ABB 1004 also receives a voice data stream from microphone 1014*a* and sends a voice data stream to mono headset 1014*b*. Usually, ABB and DBB are separate ICs. In most embodiments, ABB does not embed a programmable processor core, but performs processing based on configuration of audio paths, filters, gains, etc being setup by software running on the DBB. In an alternate embodiment, ABB processing is performed on the same processor that performs DBB processing. In another embodiment, a separate DSP or other type of processor performs ABB processing.

RF transceiver 1006 includes a receiver for receiving a stream of coded data frames and commands from a cellular base station via antenna 1007 and a transmitter for transmitting a stream of coded data frames to the cellular base station via antenna 1007. The transmitter may be embodied as described above in more detail with reference to FIGS. 15-16. A command received from the base station indicates what configuration number of the fixed set of preamble parameter configurations is to be used in a given cell, as described in more detail above.

A non-synchronous PRACH signal is transmitted using a selected preamble structure based on cell size when data is ready for transmission as described above. In particular, the PRACH preamble is transmitted by modulating a sequence that is produced by using a received indication of a logical index of a first sequence and using an auxiliary parameter, wherein the sequence is selected from an ordered group of sequences, and wherein the ordered group of sequences is a proper subset of a pre-defined set of sequences, as described in more detail with respect to FIGS. 2-13 In response, scheduling commands are received from the serving base station. Among the scheduling commands can be a command (implicit or explicit) to use a particular sub-channel for transmission that has been selected by the serving NodeB. Transmission of the scheduled resource blocks are performed by the transceiver using the sub-channel designated by the serving NodeB. Frequency hopping may be implied by using two or more sub-channels as commanded by the serving NodeB. In this embodiment, a single transceiver supports OFDMA and SC-FDMA operation but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by cell phone 1000.

The basic SC-FDMA DSP radio can include DFT, subcarrier mapping, and IFFT (fast implementation of IDFT) to form a data stream for transmission and DFT, subcarrier de-mapping and IFFT to recover a data stream from a received signal. DFT, IFFT and subcarrier mapping/de-mapping may be performed by instructions stored in memory 1012 and executed by DBB 1002 in response to signals received by transceiver 1006.

DBB unit 1002 may send or receive data to various devices connected to USB (universal serial bus) port 1026. DBB 1002 is connected to SIM (subscriber identity module) card 1010 and stores and retrieves information used for making calls via the cellular system. DBB 1002 is also connected to memory 1012 that augments the onboard memory and is used for various processing needs. DBB 1002 is connected to Bluetooth baseband unit 1030 for wireless connection to a microphone 1032*a* and headset 1032*b* for sending and receiving voice data.

DBB 1002 is also connected to display 1020 and sends information to it for interaction with a user of cell phone 1000 during a call process. Display 1020 may also display pictures received from the cellular network, from a local camera 1026, or from other sources such as USB 1026.

DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder 1022 provides encoding according to PAL/SECAM/NTSC video standards.

As used herein, the terms "applied," "coupled," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description.

Embodiments of this invention apply to any flavor of frequency division multiplex based transmission. Thus, the concept of valid specification of sub-channels can easily be applied to: OFDMA, OFDM, DFT-spread OFDM, DFT-spread OFDMA, SC-OFDM, SC-OFDMA, MC-CDMA, and all other FDM-based transmission strategies.

A NodeB is generally a fixed station and may also be called a base transceiver system (BTS), an access point, or some other terminology. A UE, also commonly referred to as terminal or mobile station, may be fixed or mobile and may be a wireless device, a cellular phone, a personal digital assistant (PDA), a wireless modem card, and so on.

In a general embodiment of the present disclosure, the set of allowed PRACH preamble signals is defined by two other sets: 1) a set of allowed root CAZAC sequences, and 2) a set of allowed modifications to a given root CAZAC sequence. In one embodiment, PRACH preamble signal is constructed from a CAZAC sequence, such as a ZC sequence. Additional modifications to the selected CAZAC sequence can be performed using any of the following operations: multiplication by a complex constant, DFT, IDFT, FFT, IFFT, cyclic shifting, zero-padding, sequence block-repetition, sequence truncation, sequence cyclic-extension, and others. Thus, in various embodiments of the present disclosure, a UE constructs a PRACH preamble signal by selecting a CAZAC sequence, possibly applying a combination of the described modifications to the selected CAZAC sequence, modulating the modified sequence, and transmitting the resulting PRACH signal over the air.

In some embodiments, the fixed set of preamble parameters stores both the cyclic shift values and the number of root sequences, while in other embodiments the cyclic shift values are stored and the number of root sequences is computed from the cyclic shift values.

It is therefore contemplated that the appended claims will cover any such modifications of the embodiments as fall within the true scope and spirit of the invention.

What is claimed is:

1. Method for communicating, comprising:
receiving at a user equipment an indication of a logical index for a first sequence, wherein the first sequence belongs to a pre-defined set of sequences; receiving at a user equipment an indication of an auxiliary parameter, wherein the auxiliary parameter indicates whether current cell is a high speed cell or not;
producing a second sequence using the received indication of the logical index of the first sequence and using the auxiliary parameter, wherein the second sequence is a Cyclically Shifted Zadoff-Chu(CS-ZC) sequence selected from an ordered group of sequences, and wherein the ordered group of sequences is a proper subset of the pre-defined set of sequences; and
producing a transmission signal by modulating the second sequence.

2. Method of claim 1, wherein the second sequence has a logical index and a generating index;
wherein the logical index indicates a position of a sequence within the ordered group; and
wherein producing a second sequence comprises:
determining the generating index of the second sequence; and
producing the second sequence by using said generating index.

3. Method of claim 2, wherein determining the generating index of the second sequence comprises:
selecting a logical index for the second sequence from a set of logical index candidates, wherein the set of logical index candidates is determined by the auxiliary parameter and by the logical index of the first sequence; and
producing the generating index of the second sequence from its logical index.

4. Method of claim 1, wherein the second sequence has a logical index; and
wherein the logical index of the second sequence indicates a position of the second sequence within the ordered group; and
wherein producing the second sequence comprises:
retrieving the second sequence stored locally using the logical index of the second sequence, wherein the logical index of the second sequence is selected from a set of logical index candidates, and wherein the set of logical index candidates is determined by the auxiliary parameter and by the logical index of the first sequence.

5. Method of claim 1, wherein a primary metric and a secondary metric are defined for each sequence in the set; wherein there are exactly 2M ordered groups of sequences; wherein M is an integer; wherein $N(1), N(2), \ldots, N(2M)$ are integers; wherein each K-th group comprises sequences with logical indexes L wherein K and L are nonnegative integers which satisfy $N(K) \leq L \leq N(K+1)-1$; wherein the primary metric is a monotonically decreasing function of L within the K-th group whenever K is odd and $K \leq M$; wherein the primary metric is a monotonically decreasing function of L within the K-th group whenever K is even and $K > M$; wherein the primary metric is a monotonically increasing function of L within the K-th group whenever K is even and $K \leq M$; wherein the primary metric is a monotonically increasing function of L within the K-th group whenever K is odd and $K > M$.

6. Method of claim 5, wherein the primary metric is a cubic metric (CM); wherein the primary metric is no greater than a threshold value for the K-th group with $K \leq M$; and wherein the primary metric is greater than the threshold value for the K-th group with $K > M$; and
wherein the threshold value is 1.2 dB.

7. Method of claim 5, wherein $N_{cs}(1), N_{cs}(2), \ldots, N_{cs}(2M+1)$ are integers; wherein the secondary metric for each sequence in the K-th group belongs inside an interval $[N_{cs}(K), N_{cs}(K+1)]$ for $1 \leq K \leq M$ and the interval $[N_{cs}(K+1), N_{cs}(K)]$ for $M+1 \leq K \leq 2M$; wherein for $K \leq M$ said intervals satisfy $N_{cs}(K) < N_{cs}(K+1)$; wherein for $K > M$ said intervals satisfy $N_{cs}(K) > N_{cs}(K+1)$; and wherein $N_{cs}(K) = N_{cs}(2M+2-K)$.

8. Method of claim 7, wherein the set of sequences comprises Zadoff-Chu (ZC) sequences; wherein each sequence has a length $N_{zc}$; wherein each ZC sequence has a unique generating index u; wherein the secondary metric for a sequence with generating index u is $\min(x, N_{zc}-x, |N_{zc}-2x|)$ wherein x is the unique integer x for which $xu \mod H_{zc}-1$; and wherein $|N_{zc}-2x|$ is the absolute value of $N_{zc}-2x$.

9. Method of claim 5, wherein the 2M groups are indexed and sequentially concatenated to produce the pre-defined set of sequences ordered by their logical indexes.

10. Method of claim 1, wherein producing a transmission signal comprises:
performing an N-point discrete Fourier transform (LEFT) on the second sequence, wherein N is the length of the sequence;
mapping the transformed sequence to a set of N sub-carriers to produce a mapped sequence, wherein N is a positive integer; and
performing an Inverse discrete Fourier transform (IDFT) on the mapped sequence to produce a time-domain signal for transmission.

11. Method of claim 1, wherein producing a transmission signal comprises:
mapping the second sequence to a set of N sub-carriers, wherein N is a positive integer; and
performing an inverse discrete Fourier transform (IDFT) on the mapped sequence to produce a time-domain signal for transmission.

12. Method of claim 10, further comprising:
up-sampling the time-domain signal to a specific sampling rate;
filtering the up-sampled signal with a low-pass filter; and
frequency shifting the filtered signal to a specific frequency location for transmission.

13. Method of claim 11, further comprising:
up-sampling the time-domain signal to a specific sampling rate;
filtering the up-sampled signal with a low-pass filter; and
frequency shifting the filtered signal to a specific frequency location for transmission.

14. Method of claim 1, wherein there is exactly one ordered group of Zadoff-Chu (ZC) sequences; wherein each ZC sequence has a generating index; wherein ordering is made by mapping the generating indexes sequentially to consecutive logical indexes such that a cubic metric (CM) of each ZC sequence is a monotonic function of the logical indexes.

15. Method of claim 1, wherein there is exactly one ordered group of Zadoff-Chu (ZC) sequences; wherein each ZC sequence has a generating index; wherein ordering is made by mapping the generating indexes $\{1, N_{zc}-1, 2, N_{zc}-2, 3, N_{zc}-3, \ldots, (N_{zc}-1)/2, (N_{zc}+1)/2\}$ sequentially to consecutive logical indexes; and wherein $N_{zc}$ is the ZC sequence length of a prime number.

16. An apparatus for transmitting in a wireless network, comprising:
memory circuitry containing at least a portion of a pre-defined set of generating indexes of Zadoff-Chu (ZC) sequences, wherein the pre-defined set of generating indexes are arranged in ordered groups and mapped sequentially to a set of consecutive logical indexes;
receiving circuitry operable to receive an indication of a logical index for a first sequence, wherein the logical index of the first sequence belongs to the set of consecutive logical indexes, and further operable to receive an indication of an auxiliary parameter, wherein the auxiliary parameter indicates whether current cell is a high speed cell or not;
producing circuitry coupled to the memory circuitry and to the receiving circuitry operable to produce a second sequence;
wherein the second sequence is a Cyclically Shifted Zadoff-Chu (CS-ZC) sequence produced from a generating index selected from the set of generating indexes in the memory circuitry using the indication of the logical index of the first sequence and using the auxiliary parameter; and
transmission circuitry coupled to the producing circuitry operable to produce a transmission signal by modulating the second sequence.

17. Method for transmission of sequences in wireless networks, comprising:
selecting a second sequence to be assigned to a user equipment (UE) within a cell served by a base station (eNB), wherein the second sequence belongs to a pre-defined set of sequences, wherein the second sequence is a Cyclically Shifted Zadoff-Chu (CS-ZC) sequence selected from an ordered group of sequences containing at least a first sequence, and wherein the ordered group of sequences is a proper subset of the pre-defined set of sequences;
transmitting from the eNB an indication of a logical index for the first sequence;
transmitting from the eNB an indication of an auxiliary parameter indicates whether current cell is a high speed cell or not, wherein the auxiliary parameter and the indication of the logical index of the first sequence together identify a logical index of the second sequence; and
receiving at the eNB a transmission signal from the UE containing a modulated second sequence.

18. An apparatus for communicating in a wireless network, comprising:
circuitry for receiving at a user equipment an indication of a logical index for a first sequence, wherein the first sequence belongs to a pre-defined set of sequences;
circuitry for receiving at the user equipment an indication of an auxiliary parameter, wherein the auxiliary parameter indicates whether current cell is a high speed cell or not;
circuitry for producing a second sequence using the received indication of the logical index of the first sequence and using the auxiliary parameter, wherein the second sequence is a Cyclically Shifted Zadoff-Chu (CS-ZC) sequence selected from an ordered group of sequences, and wherein the ordered group of sequences is a proper subset of the pre-defined set of sequences; and
circuitry for producing a transmission signal by modulating the second sequence.

19. A method for transmitting in a wireless network, comprising:
arranging a pre-defined set of generating indexes into ordered groups;
mapping the ordered groups of generating indexes sequentially to a set of consecutive logical indexes;
receiving an indication of a logical index for a first sequence, wherein the logical index of the first sequence belongs to the set of consecutive logical indexes, and further operable to receive an indication of an auxiliary parameter, wherein the auxiliary parameter indicates whether current cell is a high speed cell or not;
producing a second sequence, wherein the second sequence is a Cyclically Shifted Zadoff-Chu (CS-ZC) sequence produced from a generating Index selected from the set of generating indexes in the memory circuitry using the indication of the logical index of the first sequence and using the auxiliary parameter; and
producing a transmission signal by modulating the second sequence.

20. An apparatus for communicating in a wireless network, comprising:
- circuitry for selecting a second sequence to the assigned to a user equipment (UE) within a cell served by a base station (eNB), wherein the second sequence belongs to a pre-defined set of sequences, wherein the second sequence is a Cyclically Shifted Zadoff-Chu (CS-ZC) sequence selected from an ordered group of sequences containing at least a first sequence, and wherein the ordered group of sequences is a proper subset of the pre-defined set of sequences;
- circuitry for transmitting from the eNB an indication of a logical index for the first sequence;
- circuitry for transmitting from the eNB an indication of an auxiliary parameter indicates whether current cell is a high speed cell or not, wherein the auxiliary parameter and the indication of the logical index of the first sequence together identify a logical index of the second sequence; and
- circuitry for receiving at the eNB a transmission signal from the UE containing a modulated second sequence.

\* \* \* \* \*

UNITED STATES PATENT AND TRADEMARK OFFICE
CERTIFICATE OF CORRECTION

PATENT NO. : 9,774,424 B2
APPLICATION NO. : 14/326354
DATED : September 26, 2017
INVENTOR(S) : Jiang et al.

It is certified that error appears in the above-identified patent and that said Letters Patent is hereby corrected as shown below:

On the Title Page

On page 2, in Column 2, item (56), under "Other Publications", Line 25-26, delete "Aliecation" and insert --Allocation-- therefor On page 2, in Column 2, item (56), under "Other Publications", Line 28, delete ""Preambie index Flapping" and insert --"Preamble Index Mapping-- therefor In the Claims In Column 25, Line 50, in Claim 1, delete "Method" and insert --A method-- therefor In Column 25, Line 53, in Claim 1, after "sequences;", insert --¶--

In Column 25, Line 60, in Claim 1, delete "Zadoff-Chu(CS-ZC)" and insert --Zadoff-Chu (CS-ZC)-- therefor In Column 25, Line 66, in Claim 2, delete "Method" and insert --The method-- therefor In Column 26, Line 8, in Claim 3, delete "Method" and insert --The method-- therefor In Column 26, Line 18, in Claim 4, delete "Method" and insert --The method-- therefor In Column 26, Line 30, in Claim 5, delete "Method" and insert --The method-- therefor In Column 26, Line 31, in Claim 5, after "set;", insert --¶--

In Column 26, Line 32, in Claim 5, after "sequences;", insert --¶--

Signed and Sealed this
Eleventh Day of June, 2019

Andrei Iancu
*Director of the United States Patent and Trademark Office*

CERTIFICATE OF CORRECTION (continued)
U.S. Pat. No. 9,774,424 B2

In Column 26, Line 33, in Claim 5, after "integer;", insert --¶--

In Column 26, Line 34, in Claim 5, after "integers;", insert --¶--

In Column 26, Line 35, in Claim 5, delete "nonnegative" and insert --non negative-- therefor In Column 26, Line 36, in Claim 5, after "N(K)≤L≤N(K+1)-1;", insert --¶--

In Column 26, Line 38, in Claim 5, after "K≤M;", insert --¶--

In Column 26, Line 40, in Claim 5, after "K>M;", insert --¶--

In Column 26, Line 43, in Claim 5, after "K≤M;", insert --¶--

In Column 26, Line 46, in Claim 6, delete "Method" and insert --The method-- therefor In Column 26, Line 47, in Claim 6, after "(CM);", insert --¶--

In Column 26, Line 48, in Claim 6, after "and", insert --¶--

In Column 26, Line 52, in Claim 7, delete "Method" and insert --The method-- therefor In Column 26, Line 53, in Claim 7, after "integers;", insert --¶--

In Column 26, Line 55, in Claim 7, delete "[$N_{cs}$CK+1)," and insert --[$N_{cs}$(K+1),-- therefor In Column 26, Line 56, in Claim 7, after "M+1≤K≤2M;", insert --¶--

In Column 26, Line 57, in Claim 7, after "$N_{cs}$(K)<$N_{cs}$(K+1);", insert --¶--

In Column 26, Line 58, in Claim 7, delete "$N_{cs}$ (K)> $N_{cs}$ (K+1); and", insert --$N_{cs}$(K)>$N_{cs}$(K+1); and¶-- therefor In Column 26, Line 60, in Claim 8, delete "Method" and insert --The method-- therefor In Column 26, Line 61, in Claim 8, after "sequences;", insert --¶--

In Column 26, Line 62, in Claim 8, after "$N_{zc}$;", insert --¶--

In Column 26, Line 63, in Claim 8, after "u;", insert --¶--

In Column 26, Line 65, in Claim 8, delete "|$N_{zc}$-2x |)" and insert --|$N_{zc}$-2x|)-- therefor In Column 26, Line 66, in Claim 8, after "and", insert --¶--

CERTIFICATE OF CORRECTION (continued)
U.S. Pat. No. 9,774,424 B2

In Column 26, Line 66, in Claim 8, delete "|$N_{zc}$-2x |is" and insert --|$N_{zc}$-2x| is-- therefor In Column 27, Line 1, in Claim 9, delete "Method" and insert --The method-- therefor In Column 27, Line 4, in Claim 10, delete "Method" and insert --The method-- therefor In Column 27, Line 6, in Claim 10, delete "(LEFT)" and insert --(DFT)-- therefor In Column 27, Line 15, in Claim 11, delete "Method" and insert --The method-- therefor In Column 27, Line 22, in Claim 12, delete "Method" and insert --The method-- therefor In Column 27, Line 28, in Claim 13, delete "Method" and insert --The method-- therefor In Column 27, Line 34, in Claim 14, delete "Method" and insert --The method-- therefor In Column 27, Line 35, in Claim 14, after "sequences;", insert --¶--

In Column 27, Line 36, in Claim 14, after "index;", insert --¶--

In Column 27, Line 41, in Claim 15, delete "Method" and insert --The method-- therefor In Column 27, Line 42, in Claim 15, after "sequences;", insert --¶--

In Column 27, Line 43, in Claim 15, after "index;", insert --¶--

In Column 27, Line 46, in Claim 15, after "and", insert --¶--

In Column 28, Line 7, in Claim 17, delete "Method" and insert --A method-- therefor In Column 28, Line 9, in Claim 17, delete "he" and insert --be-- therefor In Column 29, Line 3, in Claim 20, delete "the" and insert --be-- therefor